United States Patent
Yajima et al.

(10) Patent No.: US 12,523,147 B2
(45) Date of Patent: Jan. 13, 2026

(54) ULTRASONIC BOREHOLE CLASSIFICATION METHOD

(71) Applicant: Schlumberger Technology Corporation, Sugar Land, TX (US)

(72) Inventors: Mizuki Yajima, Sagamihara (JP); Naoki Sakiyama, Katy, TX (US); Hiroaki Yamamoto, Sugar Land, TX (US); Kong Hauw Sarwa Bakti Tan, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 305 days.

(21) Appl. No.: 18/189,281

(22) Filed: Mar. 24, 2023

(65) Prior Publication Data

US 2023/0304398 A1    Sep. 28, 2023

Related U.S. Application Data

(60) Provisional application No. 63/269,952, filed on Mar. 25, 2022.

(51) Int. Cl.
*G01V 1/50* (2006.01)
*E21B 49/00* (2006.01)
*G01V 1/46* (2006.01)
*E21B 47/085* (2012.01)

(52) U.S. Cl.
CPC .............. *E21B 49/006* (2013.01); *G01V 1/46* (2013.01); *G01V 1/50* (2013.01); *E21B 47/085* (2020.05)

(58) Field of Classification Search
CPC ........ G01V 1/46; G01V 1/50; E21B 47/0085; E21B 49/006
See application file for complete search history.

(56) References Cited

U.S. PATENT DOCUMENTS 8,547,788 B2   10/2013   Wang
2002/0183930 A1* 12/2002 Plona ................ G01V 1/48
                                                 702/6

FOREIGN PATENT DOCUMENTS

WO    WO-2017210231 A1 * 12/2017 ........... E21B 47/002

OTHER PUBLICATIONS

Blyth et al., Revealing Hidden Information; High Resolution Logging-While-Drilling Slowness Measurements and Imaging Using Advanced Dual Ultrasonic Technology, SPWLA-5077, Paper presented at the SPWLA 61st Annual Logging Symposium, Virtual Online Webinar, Jun. 2020, 20 pages.
Winkler et al., Measurements of Third-order Elastic Constants in Rocks, The Journal of the Acoustical Society of America 100 (3), pp. 1392-1398, Sep. 1996.

(Continued)

*Primary Examiner* — Krystine E Breier
(74) *Attorney, Agent, or Firm* — Jeffrey D. Frantz

(57) ABSTRACT

A method for classifying a subterranean formation includes rotating an ultrasonic logging tool in a borehole penetrating a formation. The ultrasonic logging tool includes an ultrasonic transducer and an array of spaced apart ultrasonic receivers deployed on a logging tool body. The ultrasonic logging tool measures an azimuthal shear slowness image and an azimuthal compressional slowness image while rotating in the borehole. The images are evaluated to classify the homogeneity/heterogeneity and isotropy/anisotropy of the formation.

19 Claims, 14 Drawing Sheets

(56) References Cited

OTHER PUBLICATIONS

Syresin et al., Characterizing borehole stress effects with ultrasonic slowness measurements, The 23rd Formation Evaluation Symposium of Japan, Oct. 11-12, 2017, 7 pages.
Lei et al., Sonic Data Classification Using Supervised Machine-Learning Approach, SPWLA-2022-0105, SPWLA 63rd Annual Logging Symposium, Jun. 10-15, 2022, 13 pages.
Yamamoto et al., Geomechanical Feature Classification with a New Logging-While-Drilling Dual Ultrasonic Tool, IGS-2022-172, International Geomechanics Symposium, Nov. 7-9, 2022, 8 pages.

* cited by examiner

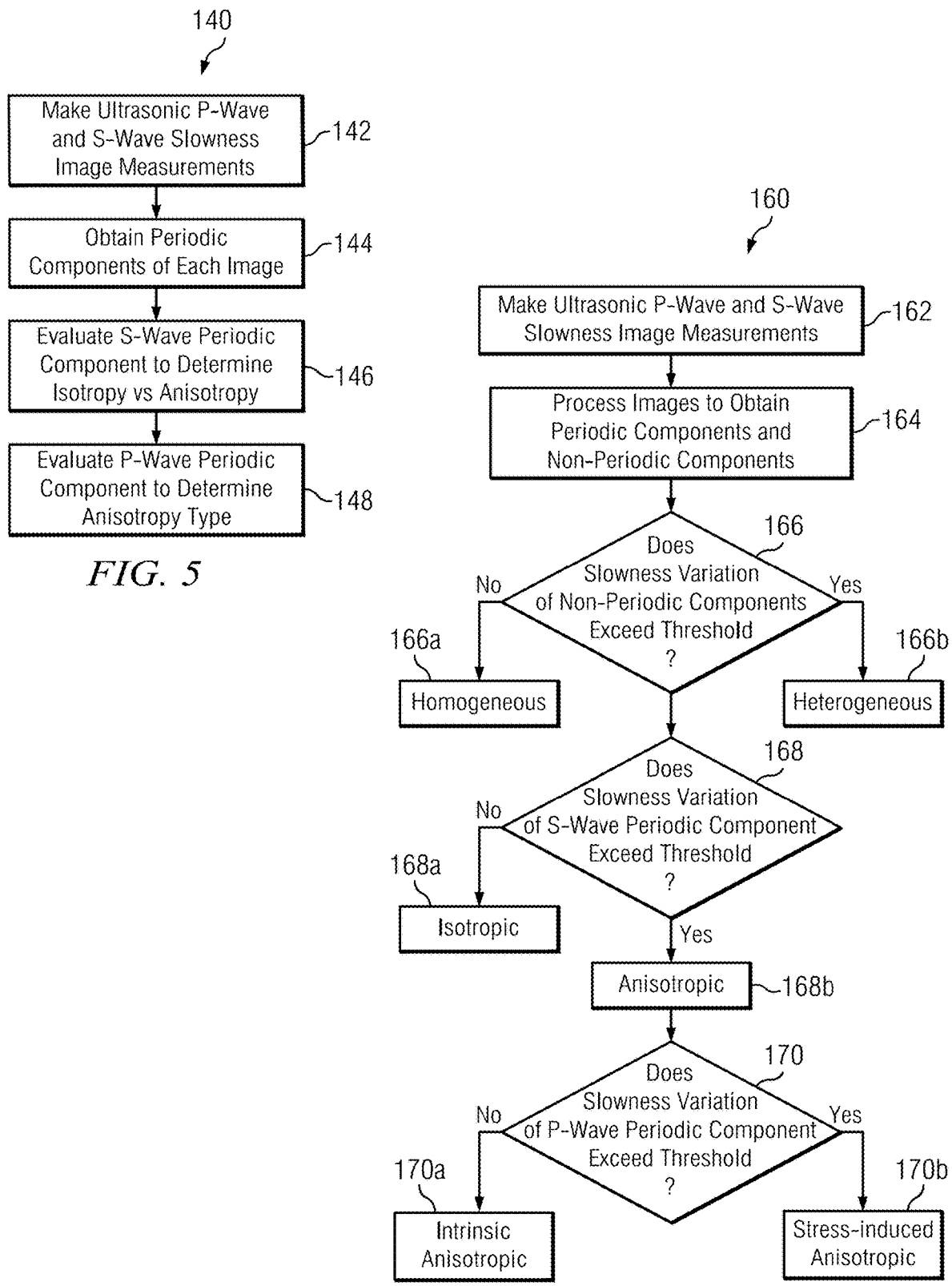

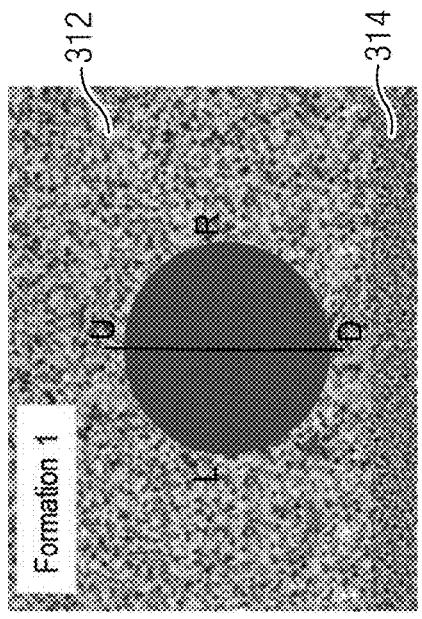
*FIG. 12C*
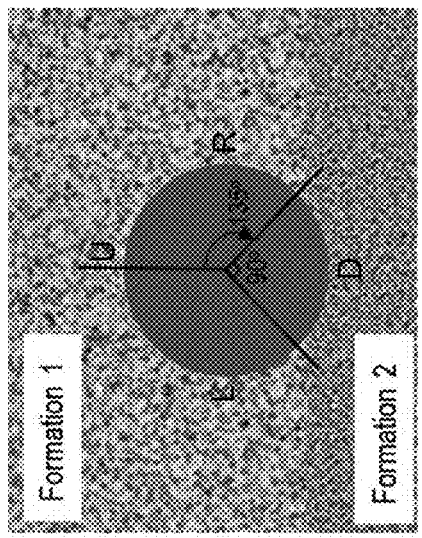
*FIG. 12B*
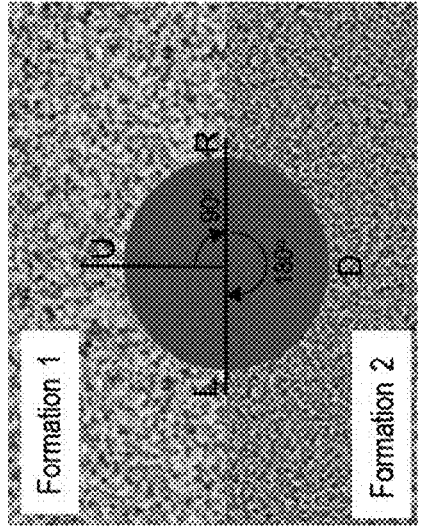
*FIG. 12A*
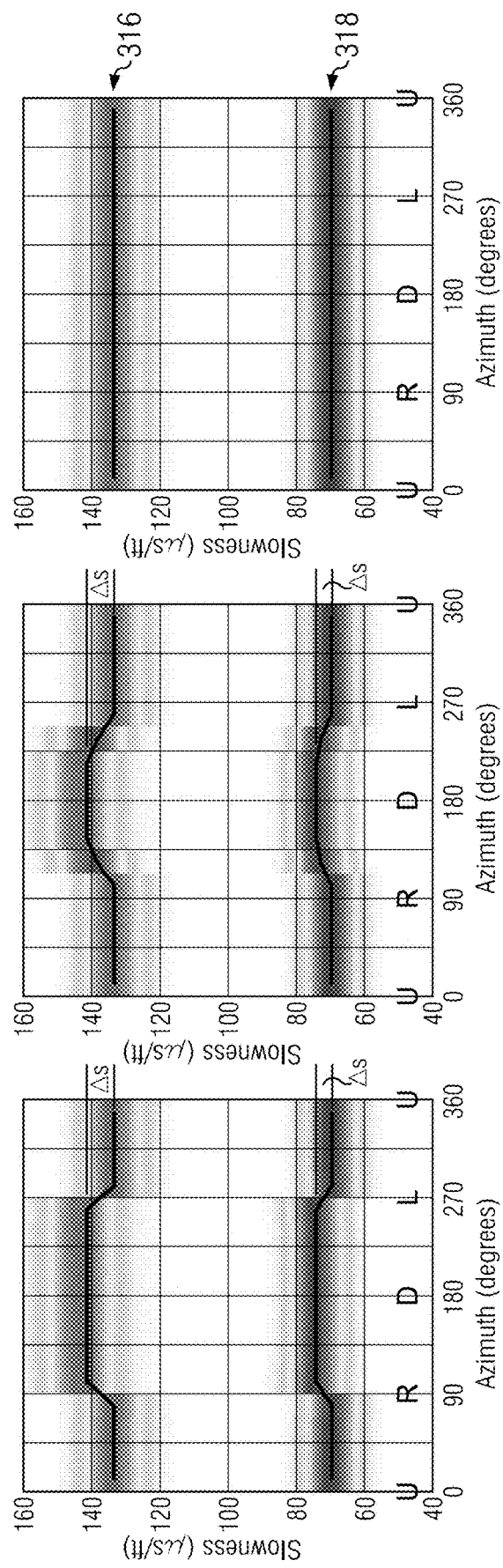

ULTRASONIC BOREHOLE CLASSIFICATION METHOD

CROSS REFERENCE TO RELATED APPLICATIONS

This application claims the benefit of U.S. Provisional Application No. 63/269,952, filed Mar. 25, 2022. The patent application identified above is incorporated herein by reference in its entirety.

BACKGROUND

Acoustic logging measurements are well-known and commonly utilized in downhole logging applications, such as in logging while drilling (LWD) and wireline logging (WL) applications. Acoustic logging measurements may be utilized, for example, to determine the slowness (inverse velocity) of sonic energy through a formation, which, along with other logging measurements may be used to estimate the porosity of the formation. Acoustic logs may also be used, for example, to identify formation lithology and source rock as well as to identify other borehole features such as fractures and compaction.

One inherent difficulty with conventional acoustic logging measurements is their general lack of azimuthal sensitivity (particularly with monopole measurements). While azimuthally sensitive measurements can be made, these measurements generally involve the use of complex dipole and quadrupole waveforms. Such dipole and quadrupole sonic logging techniques may provide limited azimuthal sensitivity; however, they do not enable azimuthal imaging.

Recent developments in ultrasonic logging provide for azimuthal caliper and acoustic slowness measurements. While such measurements have been commercially utilized, there remains a need in the art for improved ultrasonic logging techniques and methods for evaluating ultrasonic logs to interpret and classify subterranean formations.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 4, 5, 6, 7, and 8 depict flow charts of other example method embodiments for evaluating ultrasonic logging measurements to classify a subterranean formation.

FIGS. 12A, 12B, and 12C (collectively FIG. 12) depict modelled borehole geometries by which a formation may be classified as homogeneous (12C) or heterogeneous (12A and 12B) with ultrasonic pitch-catch measurements.

DETAILED DESCRIPTION

In one embodiment, a method for classifying a subterranean formation includes rotating an ultrasonic logging tool in a borehole penetrating a formation. The ultrasonic logging tool includes an ultrasonic transducer and an array of spaced apart ultrasonic receivers deployed on a logging tool body. The ultrasonic logging tool measures an azimuthal shear slowness image and an azimuthal compressional slowness image while rotating in the borehole. The azimuthal shear slowness image and the azimuthal compressional slowness image are evaluated to independently classify the formation as (i) homogeneous or heterogeneous, (ii) stress-induced anisotropic or not stress-induced anisotropic, and (iii) intrinsic anisotropic or not intrinsic anisotropic.

Example embodiments of this disclosure may advantageously classify the formation while drilling using logging while drilling ultrasonic measurements (described in more detail below). Moreover, the disclosed embodiments may distinguish between a stress-induced and an intrinsic anisotropic formation and may advantageously provide useful information for a borehole stability analysis as well as subsequent fracturing operations.

Figure 1:
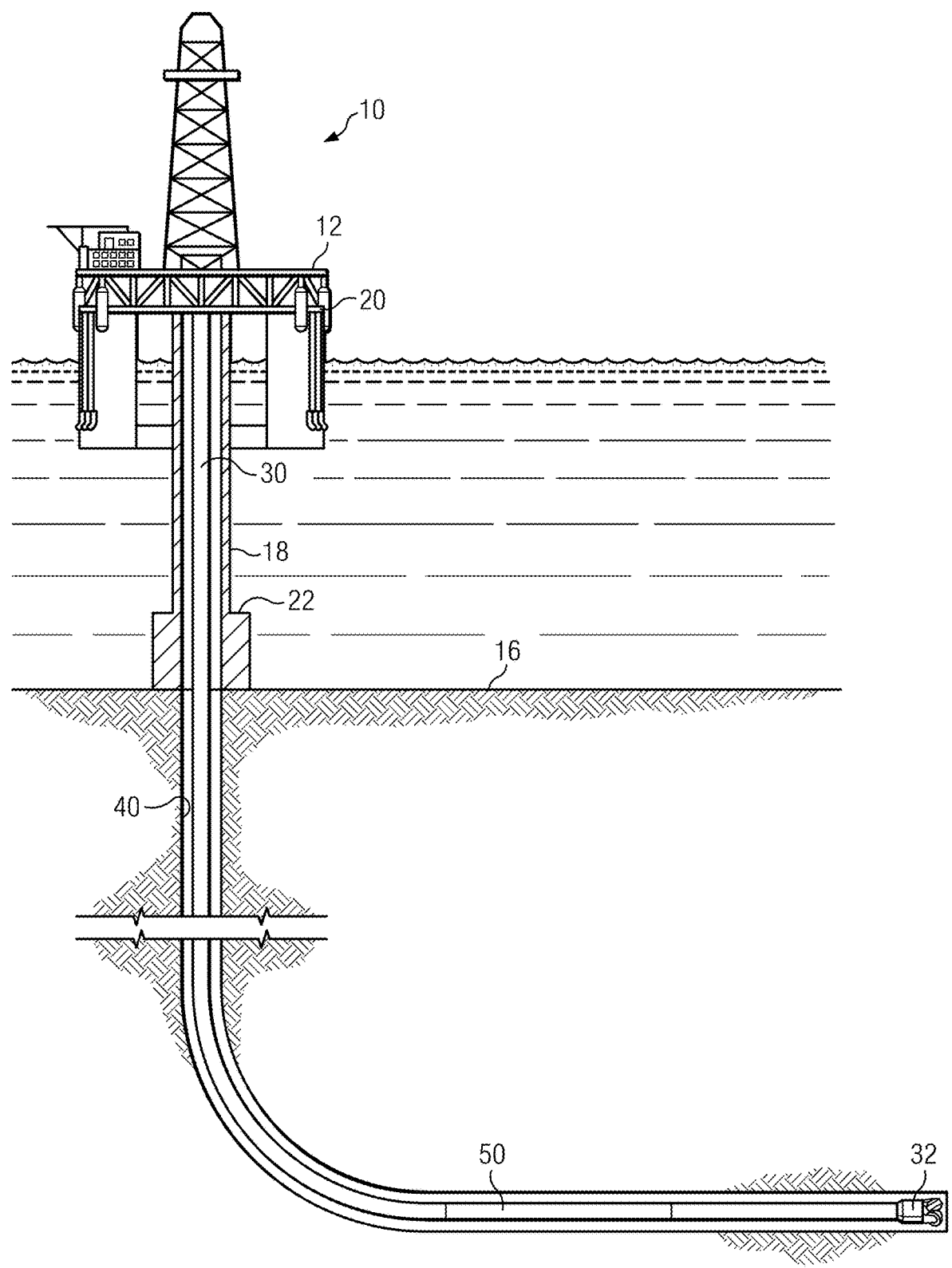
FIG. 1 depicts an example drilling rig including an ultrasonic logging tool.

FIG. 1 depicts an example drilling rig 10. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA). The BHA further includes an ultrasonic logging tool 50 deployed above the drill bit 32 (e.g., above the bit and an optional steering tool).

It will be understood that the deployment illustrated on FIG. 1 is merely an example. Drill string 30 may include substantially any suitable other downhole tools, for example, including a steering tool such as a rotary steerable tool, a downhole telemetry system, and one or more additional measurement while drilling (MWD) and/or LWD tools including various sensors for sensing downhole characteristics of the borehole and the surrounding formation. The disclosed embodiments are by no means limited to any particular drill string or BHA configuration.

It will be further understood that the disclosed embodiments are not limited to use with a semisubmersible platform 12 as illustrated on FIG. 1. The disclosed embodiments are equally well suited for use with either onshore or offshore subterranean operations. Moreover, disclosed embodiments are not limited to logging while drilling embodiments as illustrated on FIG. 1. The disclosed embodiments are equally well suited for use with any ultrasonic logging tool, including wireline logging tools and logging while drilling tools.

Figure 2A:
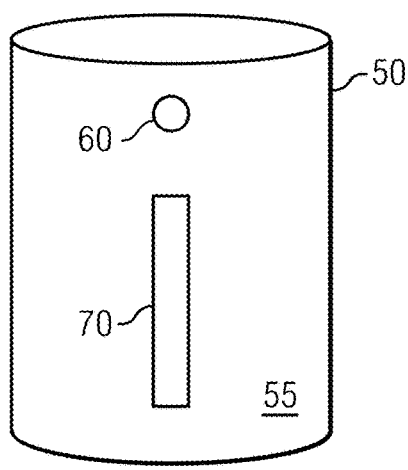
FIGS. 2A and 2B (collectively FIG. 2) depict a portion of one example of the ultrasonic logging tool shown on FIG. 1 including a pulse-echo sensor and a pitch-catch array.
Figure 2B:
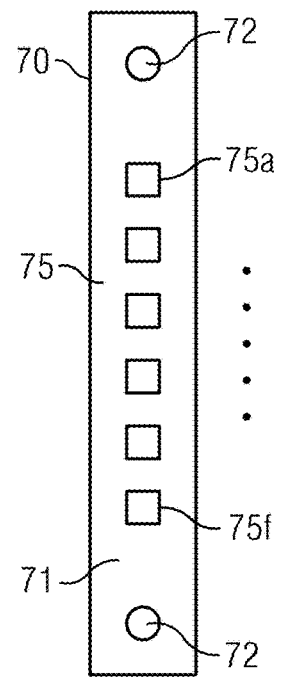

FIGS. 2A and 2B (collectively FIG. 2) depict a portion of one example embodiment of the ultrasonic logging tool 50 shown on FIG. 1. In the depicted embodiment, the tool 50 includes first and second ultrasonic sensors 60, 70 deployed on a tool collar 55 (e.g., a drill collar configured to be connected to drill string 30). The sensors 60, 70 may be azimuthally aligned, as depicted, although the disclosed embodiments are not limited in this regard. Moreover, the tool 50 may include multiple ones of at least one of the sensors, for example, axially or azimuthally spaced along the tool collar 55. It will be understood that the sensors 60, 70 are ultrasonic sensors. By ultrasonic it is meant that the sensors 60, 70 are configured to transmit and/or receive ultrasonic energy having a frequency in a range from about 20 kHz to about 5 MHz (e.g., from about 50 kHz to about 500 kHz). For example, in certain embodiments, the sensors 60, 70 may be configured to transmit and/or receive wideband ultrasonic energy centered at about 250 kHz. This is in contrast to sonic logging measurements that commonly operate at a frequency in a range from about 0.5 kHz to about 20 kHz.

Sensor 60 may include a pulse-echo ultrasonic sensor. By pulse-echo, it is meant that the sensor 60 includes an ultrasonic transducer (e.g., a piezoelectric element) that acts as both a transmitter and a receiver. In transmit mode the transducer emits a high frequency ultrasonic pulse towards the borehole wall. The reflected ultrasonic energy is received by the same transducer operating in receive mode. The tool 50 and sensor 60 may be configured, for example, to measure the amplitude of the received signal, the time between transmission and reception (time of flight), and the shape of the received waveform (e.g., the temporal variation of the amplitude of the received waveform). Moreover, the tool 50 and sensor 60 may be configured to make rapid sequential pulse-echo measurements while the tool 50 rotates in the borehole (e.g., rotating with drill string 30 while drilling) to obtain azimuthal images. These images may be evaluated, for example, to determine borehole caliper, borehole shape, formation reflectivity, and borehole rugosity, and may be further evaluated to characterize borehole fracturing.

With continued reference to FIG. 2, sensor 70 may include a pitch-catch ultrasonic sensor including at least one ultrasonic transmitter 72 and an array 75 of ultrasonic receivers. By pitch-catch it is meant that the sensor 70 includes distinct transmitter and receiver elements (e.g., as depicted). The ultrasonic transmitter 72 includes an ultrasonic transducer (e.g., a piezoelectric element) and is configured to transmit an ultrasonic signal (e.g., a pulse) that may be received (detected) at the multiple receivers in the array 75. The received signals may then be processed, for example, via semblance or other algorithms to compute the formation slowness (e.g., the surface mode wave, the shear wave, and/or compressional wave slowness values of the formation surrounding the borehole). Those of ordinary skill will readily appreciate that shear wave slowness values may sometimes be obtained or estimated from surface wave slowness values such as Rayleigh wave or pseudo-Rayleigh wave slowness. The tool 50 and sensor 70 may be configured to make rapid sequential pitch-catch measurements while the tool 50 rotates in the borehole (e.g., rotating with drill string 30 while drilling) to obtain azimuthal slowness images (e.g., shear wave and compressional wave slowness images). It will, of course, be understood that slowness and velocity are reciprocal quantities that can be readily converted one to the other.

FIG. 2B depicts one example embodiment of sensor 70. As described above, the sensor 70 includes at least one ultrasonic transmitter 72 axially spaced apart from an array 75 of ultrasonic receivers 75a . . . 75f. The receiver array 75 includes a plurality of ultrasonic receivers 75a . . . 75f (e.g., each including a distinct transducer such as a piezoelectric element) that are axially spaced apart from one another (e.g., by a common spacing) and configured to receive the transmitted ultrasonic energy. It will be understood that the receiver array 75 may include substantially any suitable number of ultrasonic receivers, for example, including 2, 3, 4, 6, 8, 12, or more. While FIG. 2B depicts an array including six receivers, the disclosed embodiments are expressly not limited in this regard.

In certain embodiments, the sensor 70 may include first and second ultrasonic transmitters 72 (e.g., located above and below the receiver array 75 as depicted). Such embodiments may enable compensated ultrasonic pitch-catch measurements to be made, for example, to account for an irregular borehole geometry or the tool being tilted in the borehole. In such compensated measurements, the first and second transmitters may be fired sequentially. The corresponding ultrasonic waveforms are received at each of the receivers in the array 75. The received waveforms (from both transmitter firings) may then be processed together to obtain the compensated measurements quantities (e.g., the shear wave and compressional wave slowness values as well as the surface mode wave slowness).

With continue reference to FIG. 2B, certain sensor 70 embodiments may be configured to make high spatial resolution ultrasonic logging measurements. For example, the sensor 70 may have an axial length of a few inches or less thereby enabling azimuthal slowness measurements to be made having a spatial resolution of about 1 inch (along the axis of the borehole). The sensors 60, 70 may be further sized and shaped to make azimuthally resolved measurements (e.g., while the tool 50 rotates in a borehole). For example, the ultrasonic measurements made using sensors 60, 70 may be configured to bin the measurements into azimuthal sectors such as 8, 16, 24, 36, 48, 64, 128, or more azimuthal sectors. In certain non-limiting embodiments, sensor 60 may be configured to bin pulse-echo measurements into 64 or more azimuthal sectors (e.g., up to 180 sectors), while sensor 70 may be configured to bin pitch-catch measurements into 16 azimuthal sectors.

It will be understood that while not depicted, ultrasonic logging tool 50 may further include one or more toolface (azimuth) sensors, for example, including an accelerometer set, a magnetometer set, or a gyroscopic sensor set. A toolface sensor may be configured to measure the toolface angle of sensors 60, 70 while rotating and to pair the ultrasonic sensor measurements with a corresponding toolface angle (e.g., via time stamping the measurements). These measurement pairs may then be processed to construct two-dimensional logging images in which the ultrasonic sensor data (or derived quantities such as the formation slowness values) are delineated by toolface angle (azimuth) and measured depth along the axis of the borehole.

While also not depicted on FIG. 2, it will be understood that ultrasonic logging tool 50 may include a controller or processor configured to make the above-described ultrasonic logging measurements and to construct the corresponding ultrasonic images. In certain embodiments, the processor may be further configured to classify the interrogated formation (e.g., as described in more detail below). It will be understood that such a downhole processor may be configured to perform any portion of the disclosed method embodiments.

Figure 3A:
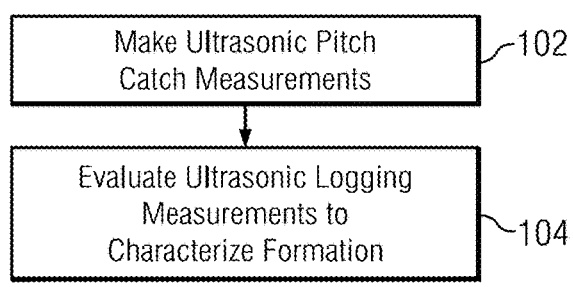
FIGS. 3A and 3B (collectively FIG. 3) depict flow charts of example method embodiments for evaluating ultrasonic logging measurements to classify a subterranean formation and to estimate a sonic slowness of the formation.
Figure 3B:
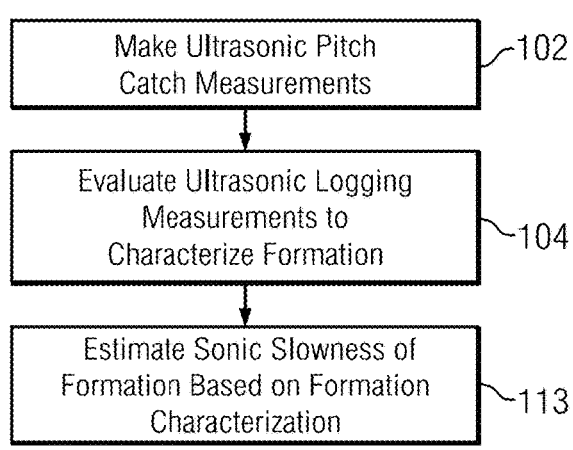

FIGS. 3A and 3B (collectively FIG. 3) depict flow charts of one example method embodiment 100 (3A) for classifying a subterranean formation and one example method embodiment 110 (3B) for estimating a sonic (audible) slowness of a formation. Method 100 includes making ultrasonic logging while drilling measurements at 102 and evaluating the measurements at 104 to classify the subterranean formation. The ultrasonic measurements may include any suitable pulse-echo and/or pitch-catch ultrasonic measurements (e.g., obtained as described above with respect to FIG. 2). The measurements may be made, for example, via rotating an ultrasonic logging tool (e.g., tool 50) in a fluid filled borehole that penetrates a subterranean formation, causing the ultrasonic transmitter(s) to fire (emit a pulse of ultrasonic energy into the borehole), causing the ultrasonic receivers to receive corresponding waveforms, and evaluating the received waveforms to generate ultrasonic logging images (e.g., the above-described slowness images). The images may then be further evaluated to determine whether the formation is homogeneous or heterogeneous and/or whether the formation is isotropic or anisotropic. Formation anisotropy may be further evaluated to determine whether the anisotropy is intrinsic and/or stress-induced.

It will be understood that the terms homogeneous, heterogeneous, isotropic, and anisotropic are used herein to describe formation attributes in a manner consistent with their dictionary definitions. A homogeneous formation is one whose properties (particularly sonic and ultrasonic properties in this context) do not change with location. Those of ordinary skill will readily appreciate that ideally (or perfectly) homogeneous formations do not exist in the real world, however, many formations are close enough that they are considered to be homogeneous (or practically homogeneous). A heterogeneous formation is one whose properties change with location. An isotropic formation is one whose properties are the same in all directions. Again, those of ordinary skill will readily appreciate that ideally (or perfectly) isotropic formations do not exist in the real world, however, many formations are close enough that they are considered to be isotropic (or practically isotropic). An anisotropic formation is one having directionally dependent properties.

With continued reference to FIG. 3B, one example method 110 for estimating a sonic (audible) slowness of a formation from the ultrasonic slowness measurements is disclosed. The method includes making ultrasonic logging while drilling measurements at 102, e.g., as described above with respect to FIG. 3A, and evaluating the ultrasonic logging measurements at 104 to classify the subterranean formation (as described in more detail below with respect to FIGS. 4-7). Method 110 further includes estimating a sonic slowness of the formation based on the formation classification and the measured ultrasonic slowness values at 113. For example, in certain formation types, the sonic slowness values may be estimated to be about equal to the measured and/or inverted ultrasonic slowness values. In other example embodiments, the sonic slowness values may be estimated to be equal to the measured ultrasonic slowness values plus or minus a small offset. It has been found that sonic slowness values are similar to ultrasonic slowness values in intrinsic anisotropic formations and differ from the ultrasonic slowness values (e.g., are significantly greater than or smaller than the ultrasonic slowness values) in stress-induced anisotropic formations as described in more detail below with respect to FIG. 13.

Figure 4:
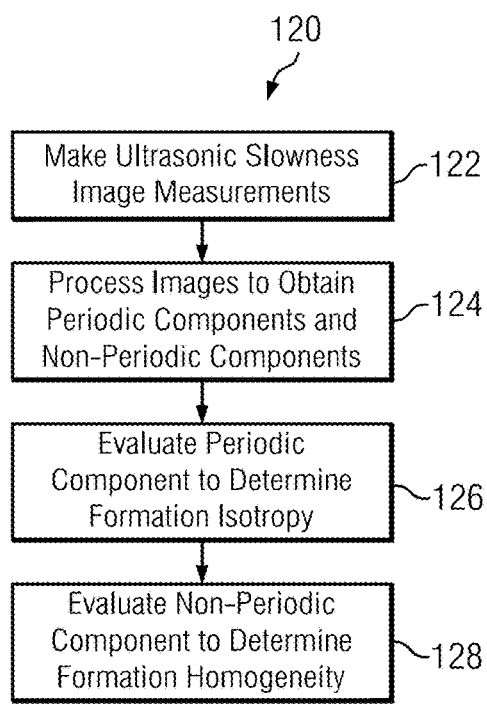

FIG. 4 depicts a flowchart of another example method embodiment 120 for classifying a subterranean formation. Ultrasonic logging while drilling measurements are made at 122, for example, as described above with respect to FIG. 3A. The measurements are evaluated 124 to obtain (e.g., identify, acquire, and/or extract) a periodic component thereof, for example, a periodic component having a period of 180 degrees in azimuth (about 150 to about 210 degrees) and to obtain a non-periodic component (e.g., by removing the periodic component from the original image). The periodic component may be obtained from the ultrasonic slowness image using any suitable methods, for example, including bandpass filtering, Fourier processing, and/or curve fitting. Such techniques are known to those of ordinary skill in the art. In one example embodiment, a periodic component having a period of about 180 degrees may be obtained using a two-cycle Fourier series expansion. The obtained periodic component may be evaluated at 126 to classify formation isotropy (e.g., whether the formation is isotropic or anisotropic or to determine a degree of anisotropy based on an amplitude of the periodic component). The non-periodic component may be evaluated at 128 to classify formation homogeneity (e.g., whether the formation is homogenous or heterogeneous or to determine a degree of heterogeneity base on an amplitude of the non-periodic component).

FIG. 5 depicts a flowchart of yet another example method embodiment 140 for classifying a subterranean formation. Ultrasonic logging while drilling measurements are made, for example as described above with respect to FIG. 3A, and evaluated at 142 to generate a compressional wave (P-wave) slowness image and a shear wave (S-wave) slowness image. The generated images are evaluated at 144 to obtain periodic components thereof, for example, as described above with respect to FIG. 4. An amplitude of the periodic component of the S-wave image is evaluated at 146 to classify the formation isotropy (e.g., to determine whether the formation is isotropic or anisotropic). When the formation is anisotropic, an amplitude of the periodic component of the P-wave image may be evaluated at 148 to classify the type of anisotropy, for example, whether the formation is intrinsic anisotropic or stress-induced anisotropic.

FIG. 6 depicts a flowchart of still another example method embodiment 160 for classifying a subterranean formation. Ultrasonic logging while drilling measurements are made, for example as described above with respect to FIG. 3A, and are evaluated at 162 to generate a compressional wave (P-wave) slowness image and a shear wave (S-wave) slowness image. The generated images (or image data) are evaluated at 164 to obtain periodic and non-periodic components thereof, e.g., as described above with respect to FIG. 4. The non-periodic component(s) may be evaluated at 166 to determine whether the formation is homogeneous at 166a or heterogeneous at 166b. In this particular embodiment the formation may be classified as heterogeneous when variations of the non-periodic components of either one or both of the P-wave and S-wave images exceed a threshold. The formation may be classified as homogeneous when the variations of the non-periodic components of one or both of the images are less than the threshold.

With continued reference to FIG. 6, the periodic component of the S-wave image (generated at 164) is evaluated at 168 to classify the formation isotropy. The formation may be classified as isotropic at 168*a* when the amplitude (e.g., slowness variation) of the periodic component of the S-wave image is less than a corresponding threshold and may be classified as anisotropic at 168*b* when the amplitude of the periodic component of the S-wave image exceeds the threshold. When the formation is classified as anisotropic it may be further classified at 170 as intrinsic anisotropic at 170*a* when the amplitude of the periodic component of the P-wave image is less than a corresponding threshold and may be classified as stress-induced anisotropic at 170*b* when the amplitude of the periodic component of the P-wave image exceeds the threshold. Note that the various thresholds described above are not necessarily (and are often not) equal to one another.

Figure 7:
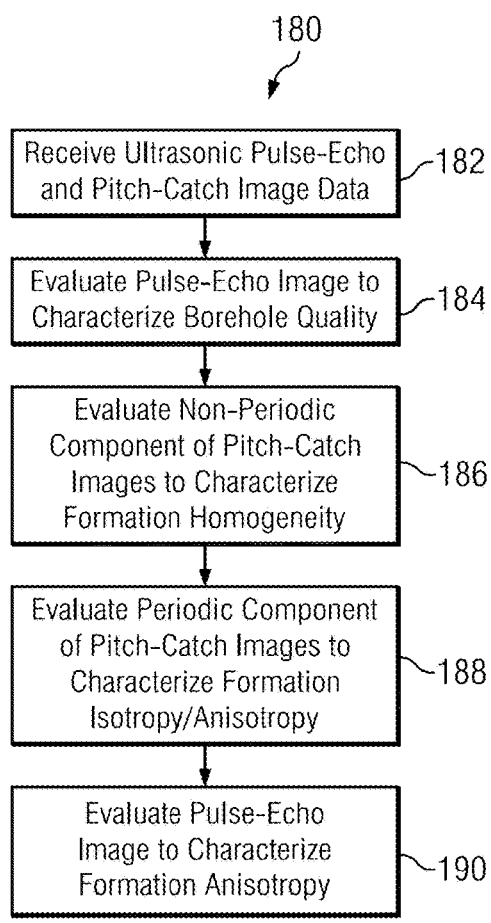

FIG. 7 depicts a further example method embodiment 180 for classifying a subterranean formation. Ultrasonic pulse-echo and pitch-catch image measurements are made at 182, for example, as described above. The pulse-echo images are evaluated at 184 to classify borehole quality. The pulse-echo image data may include, for example, a stand-off image, an amplitude image, or a calliper log plotting a wellbore diameter at each image depth. In certain embodiments the borehole may be classified as being in good (or undamaged) condition when the wellbore diameter is less than a threshold value (e.g., less than a gauge value plus a predetermined tolerance). The borehole may be classified as being in bad condition (e.g., damaged) when the wellbore diameter is greater than the threshold. For example, the borehole may be washed out at some particular depth or depth interval. In this way the pulse-echo data may be used as a quality control measure to indicate the quality of the borehole and to indicate when the ultrasonic pitch-catch measurements may be unreliable or less reliable (it will be understood that in some embodiments the pitch-catch measurements may be unreliable in low quality boreholes). For example, borehole damage has been observed to change the measured slowness since ultrasonic measurements have a depth of investigation of only a few inches and therefore tend to be most sensitive to a thin region of the formation near the borehole (the damaged region).

With continued reference to FIG. 7, the ultrasonic pitch-catch measurements may be evaluated at 186 and 188 (e.g., when the borehole quality is classified as undamaged in 184) to classify the isotropy/anisotropy of the formation. Both non-periodic (186) and periodic components (188) of S-wave and P-wave images may be evaluated as described above with respect FIGS. 5 and 6. Pulse-echo image data may also be evaluated to classify formation anisotropy at 190. For example, the pulse-echo image data may include an acoustic impedance image or an image of the amplitude of the reflected ultrasonic energy. Such images may reveal borehole fractures including both natural fractures and induced fractures. The presence of induced fractures may further indicate that formation anisotropy is stress-induced (rather than intrinsic). In certain embodiments, the pulse-echo images may be used as a quality control measure to confirm a classification of a formation as being stress-induced anisotropic (e.g., confirmed by the presence of induced fractures in the pulse-echo image). In other embodiments, the presence of induced fractures may be a necessary criterion for classifying a formation as stress-induced anisotropic. In still other embodiments, an anisotropic formation may be classified as stress-induced anisotropic when an amplitude of the periodic component of the P-wave image exceeds a threshold in 188 or when induced fractures are observed in the pulse-echo images at 190.

In the example embodiments described above with respect to FIGS. 4-7, the formation (at a particular depth or depths) may be classified as being one of seven formation categories. These seven categories and various ultrasonic measurements used to substantiate the categories are listed in Table 1. In the Table 1 example, the listed categories include damaged, homogenous isotropic (Homo-Iso), homogeneous intrinsic anisotropic (Homo-Aniso-Int), homogeneous stress-induced anisotropic (Homo-Aniso-SI), heterogeneous isotropic (Hetero-Iso), heterogeneous intrinsic anisotropic (Hetero-Aniso-Int), and heterogeneous stress-induced anisotropic (Hetero-Aniso-SI). As described above, the borehole condition may be classified, for example, based on the borehole diameter (D) being greater than or less than a threshold (TH). Borehole homogeneity may be classified, for example, based on variation (e.g., a standard deviation) of a non-periodic component of the pitch-catch data being greater than or less than a threshold (TH). Borehole isotropy may be classified, for example, based on amplitudes of S-wave and P-wave periodic components of the pitch-catch data being greater than or less than corresponding thresholds (TH), by the presence of induced fractures in pulse-echo images, or by a comparison of the fastest compressional azimuth and the fastest shear azimuth.

TABLE 1

| Category | Pulse-Echo | Pitch-Catch Non-Periodic | Pitch-Catch Periodic |
|---|---|---|---|
| Damaged | D > TH | NA | NA |
| Homo-Iso | D < TH | Amplitude < TR | Amplitude (S) < TR |
| Homo-Aniso-Int | D < TH | Amplitude < TR | Amplitude (S) > TR |
|  |  |  | Amplitude (P) < TR |
| Homo-Aniso-SI | D < TH Induced Fractures | Amplitude < TR | Amplitude (S) > TR Amplitude (P) > TR |
| Hetero-Iso | D < TH | Amplitude > TR | Amplitude (S) < TR |
| Hetero-Aniso-Int | D < TH | Amplitude > TR | Amplitude (S) > TR |
|  |  |  | Amplitude (P) < TR |
| Hetero-Aniso-SI | D < TH Induced Fractures | Amplitude > TR | Amplitude (S) > TR Amplitude (P) > TR |

Figure 8:
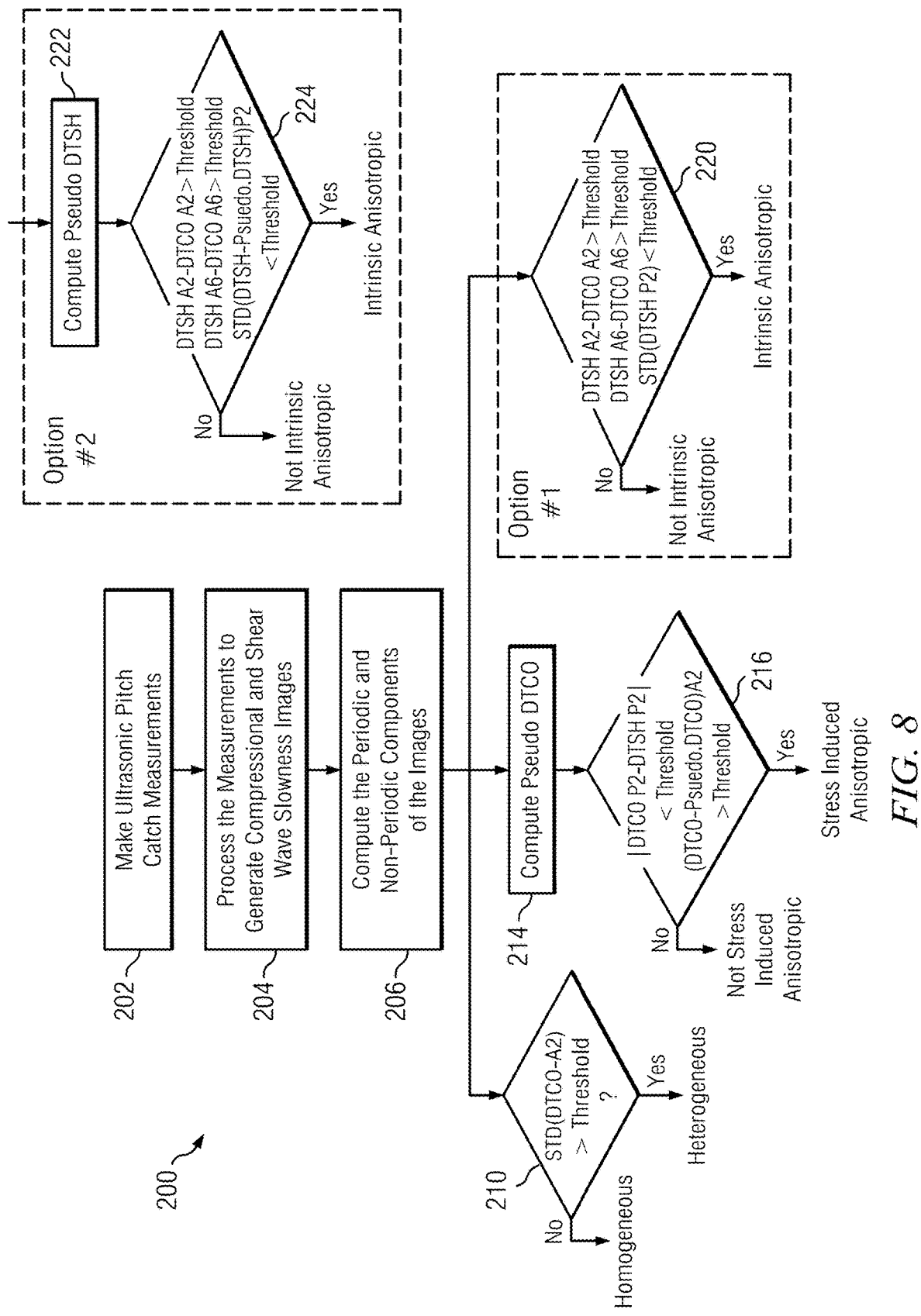

Turning now to FIG. 8, a flow chart of yet a further method 200 for classifying a subterranean formation is depicted. Method 200 may advantageously classify the formation (at a particular depth or depths) as being one of eight formation categories (or nine if borehole damage is considered) using a three-bit classification scheme. The three-bit classification may be advantageously performed in a controller or processor in the ultrasonic logging tool 50 (FIG. 1) and may then be transmitted to the surface (e.g., using MWD mud pulse or mud siren telemetry). One example three-bit classification scheme is given in Table 2 in which the first bit indicates whether the formation is homogeneous (0) or heterogeneous (1). The second bit indicates whether or not the formation is intrinsic anisotropic and the third bit indicates whether or not the formation is stress-induced anisotropic. In this scheme the formation is indicated as being isotropic (00) when it is neither intrinsic or stress-induced anisotropic. The formation is indicated as being intrinsic and stress-induced anisotropic (11) when it is both intrinsic and stress-induced anisotropic. The formation can also be indicated as being either intrinsic anisotropic (10) or stress-induced anisotropic (01).

TABLE 2

| Ho:He | A-In | A-St | Classification |
|---|---|---|---|
| 0 | 0 | 0 | Homogeneous-Isotropic |
| 0 | 0 | 1 | Homogeneous-Anisotropic Stress Induced |
| 0 | 1 | 0 | Homogeneous-Anisotropic Intrinsic |
| 0 | 1 | 1 | Homogeneous-Anisotropic Intrinsic and Stress Induced |
| 1 | 0 | 0 | Heterogeneous-Isotropic |
| 1 | 0 | 1 | Heterogeneous-Anisotropic Stress Induced |
| 1 | 1 | 0 | Heterogeneous-Anisotropic Intrinsic |
| 1 | 1 | 1 | Heterogeneous-Anisotropic Intrinsic and Stress Induced |

With continued reference to FIG. 8, ultrasonic pitch catch measurements are made at 202, for example as described above. Ultrasonic or sonic pulse echo measurements may also be made at 202 as also described above. The measurements are evaluated at 204 to generate a compressional wave (P-wave) slowness image and a shear wave (S-wave) slowness image. For example, the compressional wave slowness may be a delta-time compressional slowness (DTCO) and the shear wave slowness may be a delta-time shear slowness (DTSH). The generated images (or image data) may be evaluated at 206 using a Fourier series expansion to obtain periodic and non-periodic components of the images, e.g., as described above. In one example embodiment, the Fourier series expansion may include fitting the azimuthal slowness data (the slowness image at a single depth) to an azimuth Fourier series with higher order azimuthal harmonics (e.g., from n=1 to n=8), for example, as follows:

$$\text{Azimuthal Slowness Data} = Ave + \sum_{n=1}^{8}\left(A_n \cos\left(\frac{2\pi n x}{s} - \phi_n\right)\right)$$

where Ave represents the average slowness value over the s azimuthal sectors (e.g., 16 sectors), $A_n$ represents the amplitude of each harmonic n, and $\phi_n$ represents the phase of each harmonic n. The phase is also referred to herein as $P_n$. Each of the harmonic components represents a periodic component. For example, the second order harmonic (n=2) represents a periodic component having a period of 180 degrees ($\pi$ radians) and a sixth order harmonic (n=6) represents a periodic component having a period of 60 degrees ($\pi/3$ radians). The non-periodic component (or components) may be obtained by subtracting one or more of the periodic components from the original image (the azimuthal slowness data). For example, a non-periodic component may be obtained by subtracting $A_2$ from the original azimuthal slowness data (where $A_2$ represents the amplitude of the second order harmonic).

With further reference to FIG. 8, the value of the first bit in the three-bit classification scheme may be determined by evaluating the non-periodic component of the compressional wave slowness at 210. The non-periodic component of the compression wave slowness may include, for example, DTCO–$A_2$ (indicating a nonperiodic component in which $A_2$ is subtracted from the original compressional slowness image data). In one example embodiment, the formation may be classified as homogeneous when a standard deviation of the non-periodic component is less than a threshold and as heterogeneous when standard deviation is greater than the threshold. A degree of heterogeneity may also be evaluated based on the magnitude of the standard deviation (with high standard deviation values indicating a greater degree of heterogeneity). These example criteria are shown in Table 3, where STD(DTCO–$A_2$) represents the standard deviation of the non-periodic component and TH1 represents the threshold.

TABLE 3

| Classification | Example Criteria |
|---|---|
| 0-Homogeneous | STD(DTCO – A2) < TH1 |
| 1-Heterogeneous | STD(DTCO – A2) > TH1 |

The values of the second and third bits of the three-bit classification scheme may be determined via evaluating periodic component(s) of the compressional and shear wave slowness data at 216, 220, and/or 224. For example, the formation may be classified at 216 as anisotropic stress-induced when a difference between the periodic compressional slowness phase (e.g., DTCO_$P_2$) and the periodic shear slowness phase (e.g., DTSH_$P_2$) is less than a threshold and when an amplitude of a difference between the compressional slowness and a pseudo compressional slowness is greater than a threshold ((e.g., DTCO–pseudo DTCO)_A2). It will be appreciated that the pseudo compressional slowness may be determined from pulse echo measurements at 214 as described in more detail below). Otherwise, the formation may be classified as not being anisotropic stress-induced (and may be classified as isotropic when it is also classified as not anisotropic intrinsic).

Method 200 includes two options for determining the value of the third bit of the three-bit classification scheme. In certain example embodiments, it may be advantageous to use the first option when the formation is classified as being homogeneous at 210 and the second option when the formation is classified as being heterogeneous at 210, however, the disclosure is in no way limited in this regard. In the first option, the formation may be classified as being anisotropic intrinsic at 220 when the difference between a first periodic component of the shear slowness amplitude (e.g., DTSH_$A_2$) and a first periodic component of the compressional slowness amplitude (e.g., DTCO_$A_2$) is greater than a threshold, when a difference between a second periodic component of the shear slowness amplitude (e.g., DTSH_$A_6$) and a second periodic component of the compressional slowness amplitude (e.g., DTCO_$A_6$) is greater than a threshold, and when standard deviation of the shear slowness phase (e.g., DTSH_$P_2$) is less than a threshold. In the second option, the formation may also be classified as being anisotropic intrinsic at 224. The second option includes the same first two conditions as the first option, but further specifies that the standard deviation of the phase taken from a difference between the shear slowness and a pseudo shear slowness (e.g., STD(DTSH–pseudo DTSH) $P_2$) is less than a threshold. It will be appreciated that the pseudo shear slowness may be estimated from compressional shear slowness measurements at 222 as described in more detail below. These example isotropy criteria are shown in Table 4.

TABLE 4

| Classification | Example Criteria-Option 1 | Example Criteria-Option 2 |
|---|---|---|
| 00-Isotropic | Not 01, 10, or 11 | Not 01, 10, or 11 |
| 01-Anisotropic Stress Induced | \|DTCO_P2 − DTSH_P2\| < TH2 (DTCO − pDTCO)_A2 > TH3 | \|DTCO_P2 − DTSH_P2\| < TH2 (DTCO − pseudo DTCO)_A2 > TH3 |
| 10-Anisotropic Intrinsic | DTSH_A2 − DTCO_A2 > TH4 DTSH_A6 − DTCO_A6 > TH5 STD(DTSH_P2) < TH6 | DTSH_A2 − DTCO_A2 > TH4 DTSH_A6 − DTCO_A6 > TH5 STD(DTSH − pseudo DTSH)P$_2$ < TH7 |
| 11-Anisotropic Intrinsic and Stress Induced | Both 01 and 10 | Both 01 and 10 |

It will be appreciated that using the azimuthal variation (e.g., the standard deviation) of the compressional slowness to evaluate formation isotropy (stress-induced anisotropy) is not straightforward in a highly heterogeneous formation. To overcome this difficultly, a pseudo compressional slowness image may be synthesized from ultrasonic pulse echo data at 214, for example, via transforming the measured pulse echo amplitude image to a compressional slowness image. As described above, the difference between the compressional slowness image and the pseudo compressional slowness image may then be used as criteria for stress-induced anisotropy.

Figure 9:
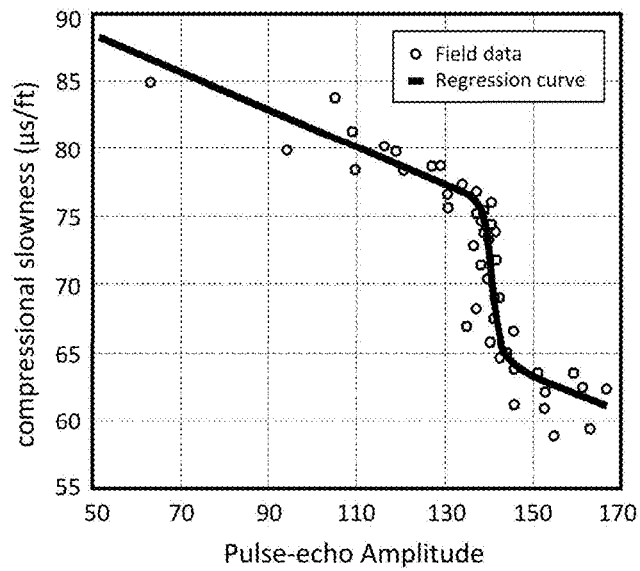
FIG. 9 plots compressional slowness versus pulse echo amplitude and a regression curve for computing a pseudo delta-time compressional slowness.

The pseudo compressional slowness image may be synthesized by measuring a pulse echo amplitude image, for example, as described above. In certain advantageous embodiments the pulse echo amplitude image may be generated using lower frequency ultrasonic energy, e.g., in a range from about 100 to about 200 kHz. Each pulse echo amplitude (in the image) may then be transformed to a compressional slowness (e.g., DTCO), for example, using a transform including a sigmoid function. It was found, using an empirical dataset, that the sigmoid (s-shaped) function provided a good fit between the pulse echo amplitudes and the compressional slowness values. One example empirical dataset is depicted in FIG. 9, which plots compressional slowness versus pulse echo amplitude. In this example, the regression curve (the transform or fitting function) is given below:

$$pDTCO = \frac{-11.3}{1 + e^{-(PE_{AMP}-140)}} - 0.136 \cdot PE_{AMP} + 95$$

where pDTCO represents the pseudo delta-time compressional slowness and PE$_{AMP}$ represents the measured pulse echo amplitude. It will be appreciated that each pulse echo amplitude PE$_{AMP}$ in the pulse echo amplitude image may be input into the above equation to compute a corresponding pseudo compressional slowness pDTCO at 214. As described above, the formation may be classified as anisotropic stress-induced at 216 when an amplitude of a difference between the compressional slowness and a pseudo compressional slowness is greater than a threshold ((e.g., DTCO–pseudo DTCO)_A2).

Figure 10:
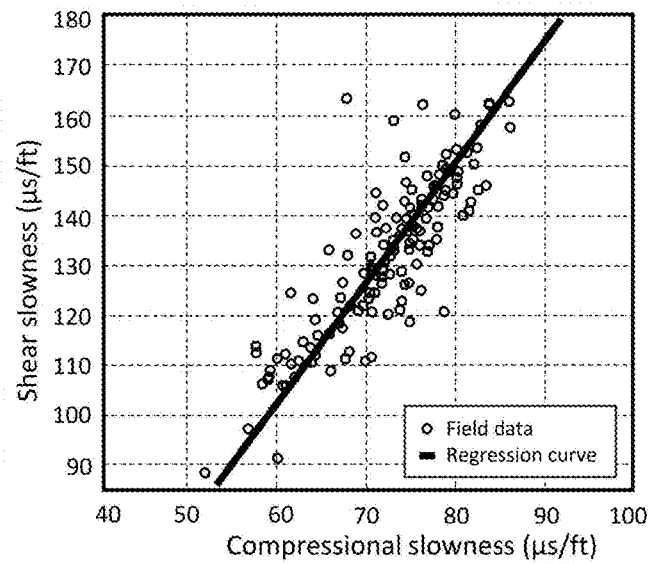
FIG. 10 plots shear slowness versus compressional slowness and a regression curve for computing a pseudo shear slowness.

With continued reference to FIG. 8, generating a pseudo shear slowness image (e.g., pseudo DTSH at 222 may also be advantageous in a heterogeneous (or highly heterogeneous) formation. Pseudo shear slowness values may be obtained, for example, via transforming compressional slowness values. A correlation (or transform) between compressional slowness and shear slowness may be obtained, for example, via plotting compressional slowness and shear over a target depth interval and fitting the plotted data to a fitting function. One example empirical dataset is depicted in FIG. 10, which plots shear slowness versus compressional slowness. In this example, the regression curve (the transform or fitting function) is a linear correlation given by the following equation:

$$pDTSH = 2.2 \cdot DTCO - 43$$

where pDTSH represents the pseudo shear slowness and DTCO represents the compressional slowness. It will be appreciated that each compressional slowness DTCO in a compressional slowness image may be input into an appropriate correlation to compute a corresponding pseudo shear slowness pDTSH at 222 As described above, the formation may be classified as anisotropic intrinsic at 224 when the standard deviation of the phase taken from a difference between the shear slowness and a pseudo shear slowness (e.g., STD(DTSH–pseudo DTSH)P$_2$) is less than a threshold.

With still further reference to FIGS. 3-8, it will be understood that the ultrasonic image data may be evaluated depth by depth (i.e., line by line in the image) to classify the formation at each measured depth in the image. For example, methods 100, 110, 120, 140, 160, 180, and 200 may be iteratively repeated at successive depth intervals while drilling the wellbore. In other embodiments, the ultrasonic images may be evaluated depth interval by depth interval (i.e., by sets or groups of lines in the image) to classify the formation at each depth interval. In these embodiments, methods 100, 110, 120, 140, 160, 180, and 200 may be iteratively repeated at each depth interval. Moreover, the disclosed embodiments are not limited to the particular methods depicted on FIGS. 3-8. It will be understood the methods (or portions thereof) may be combined with one another (e.g., by combining steps from one method with other steps from another of the methods).

The disclosed formation classification method embodiments are now described in more detail by way of the following non-limiting examples and example ultrasonic log data obtained with an ultrasonic logging tool having a similar construction to that depicted on FIG. 2.

Figure 11:
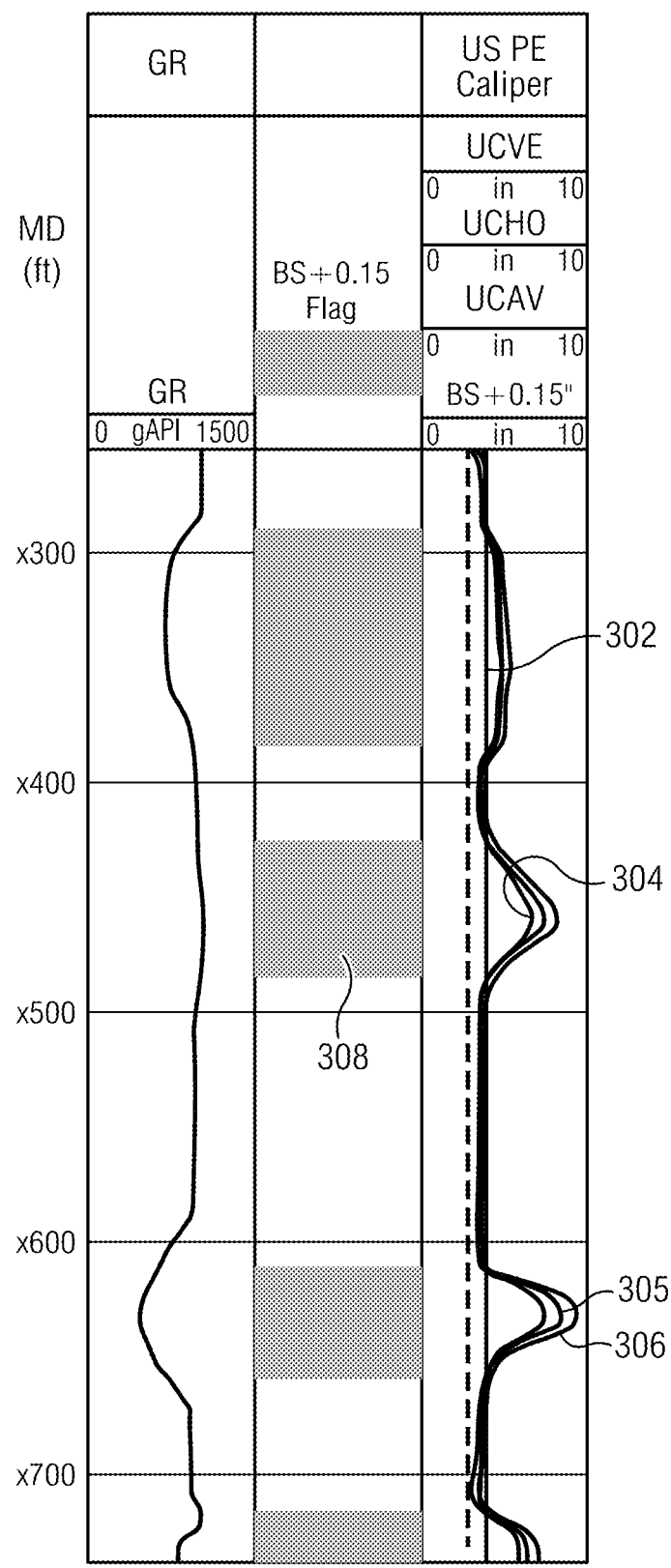
FIG. 11 depicts an example gamma ray (GR) and ultrasonic calliper log.

As described above with respect to FIGS. 3-7, ultrasonic pulse-echo data may be used to classify the borehole as being damaged (e.g., when a measured calliper exceeds a predetermined threshold). FIG. 11 depicts an example gamma ray (GR) and ultrasonic calliper log over a depth interval of about 500 feet for an ultrasonic logging operation. In the depicted example, line 304 represents an ultrasonic vertical borehole diameter measurement (UCVE), line 306 represents an ultrasonic horizontal borehole diameter measurement (UCHO), and line 305 represents an ultrasonic average diameter measurement (UCAV). The black vertical line at 302 represents the example threshold diameter, which in this example is the gauge diameter plus 0.15 inches (0.38 cm). The log may be colored, shaded, and/or flagged as depicted at 308 when the measured diameter exceeds the threshold, thereby classifying the borehole as possibly being damaged in these regions.

As further described above with respect to FIGS. 3-7, ultrasonic pitch-catch data may be evaluated to classify the formation as being homogeneous or heterogeneous. For example, a non-periodic component of the ultrasonic image data may be evaluated to classify the formation. By non-periodic it is meant that a periodic component having a period of about 180 degrees (e.g., from about 150 to about 210 degrees) has been removed from the azimuthal slowness image data.

FIGS. 12A, 12B, and 12C (collectively FIG. 12) depict modelled borehole geometries by which a formation may be classified as homogeneous or heterogeneous. As is known to those of ordinary skill in the art, high-angle and horizontal wells may intersect formation bedding such that the formation around the borehole may be azimuthally heterogeneous (12A and 12B) when it intersects first and second beds 312, 314 or azimuthally homogenous (12C) when the well only intersects a single bed 312 (or 314) within the depth of investigation of the ultrasonic pitch-catch measurements. FIGS. 12A, 12B, and 12C further depict example semblance processing results that plot S-wave and P-wave slowness values 316, 318 with respect to borehole azimuth on the horizontal axis. In this example, the second bed 314 has higher slowness values than the first bed such that the homogeneity/heterogeneity may be classified by evaluating the slowness variation in each image. In FIGS. 12A and 12B, the slowness variations ($\Delta S$) indicate the slowness differences between the first and second beds 312, 314 obtained at high (U) and low (D) sides of the borehole (e.g., at azimuth angles of 0 and 180 degrees or in adjacent azimuthal bins or sectors). As described above, the formation may be classified as being heterogeneous when $\Delta S$ exceeds a threshold and homogeneous when $\Delta S$ is less than the threshold. In directional, high angle, or horizontal wells it may be adequate to simply evaluate the difference between high and low side slowness values as depicted. It will be understood that the $\Delta S$ value for the S-wave image is not necessary (and often not) equal to the $\Delta S$ value for the P-wave image.

Figure 13:
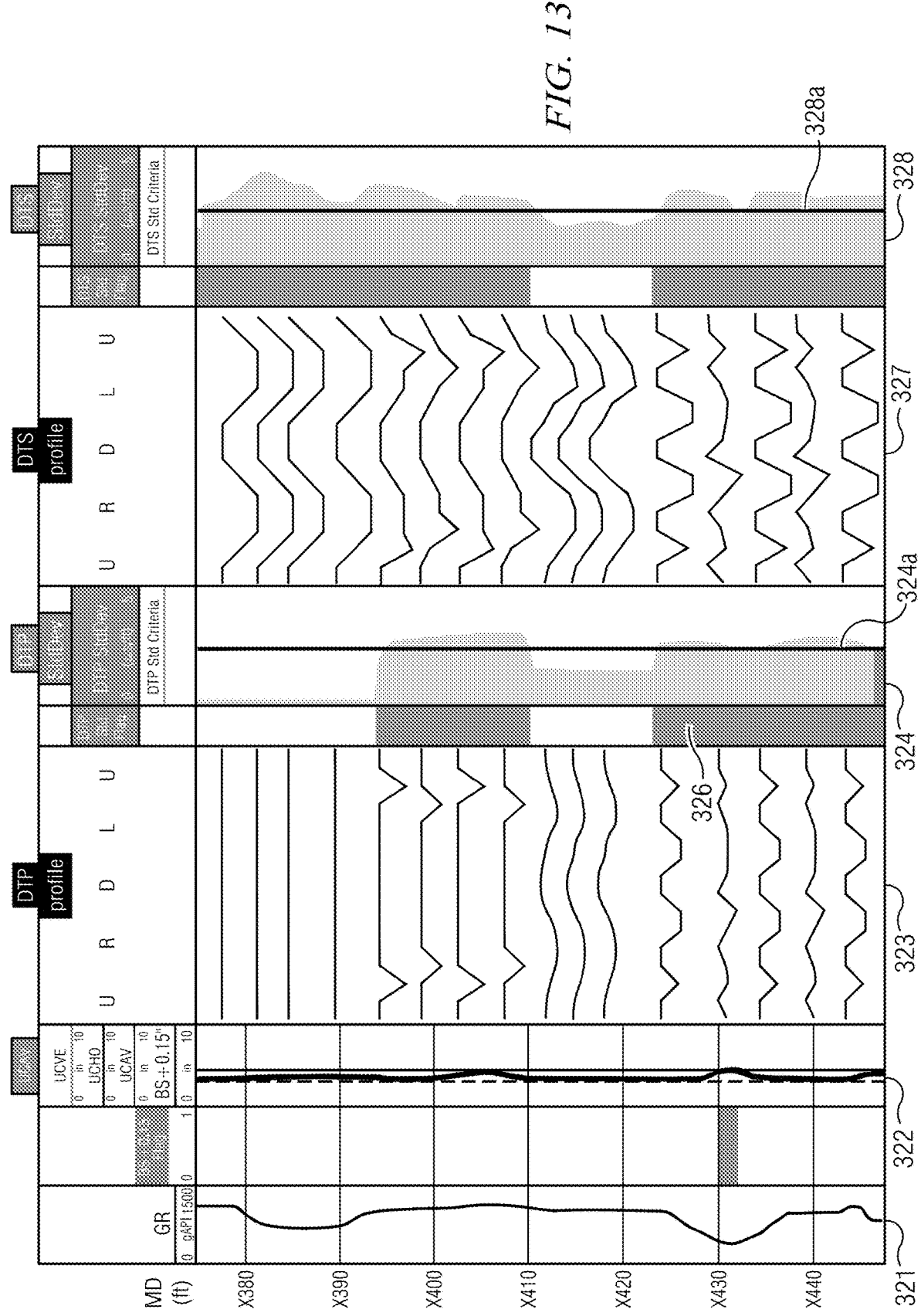
FIG. 13 depicts a portion of an example ultrasonic pitch-catch slowness log showing P-wave and S-wave slowness profiles and corresponding standard deviations of the slowness values.

FIG. 13 depicts a portion of an example ultrasonic pitch-catch slowness log. The log plots gramma ray (GR) and ultrasonic calliper (diameter) measurements at 321, 322 with respect to measured depth (MD) of the borehole. Compressional wave and shear wave slowness images (slowness versus azimuth and measured depth) are shown at 323, 327 (with the amplitude of the azimuthal slowness indicated on the vertical axis). Standard deviations of the compressional wave and shear wave slowness values are shown at 324, 328. The standard deviation values 324, 328 are computed from the azimuthally binned slowness values at each measured depth. In certain example embodiments, individual depths or depth intervals of the formation in which the slowness values have a high standard deviation (e.g., a standard deviation of the P-wave slowness and/or S-wave slowness above corresponding thresholds) may be classified as heterogeneous while those having low standard deviation values (less than a threshold) may be classified as homogenous. Example standard deviation thresholds are shown at 324*a* and 328*a*. The log may further include a colored or shaded standard deviation flag 326 when the standard deviation value exceeds the threshold. In the depicted log, the formation may be classified as heterogeneous, for example, when the standard deviation of both the compressional wave slowness and shear wave slowness exceeds the threshold as shown at depths of X400 and X440. The formation may otherwise be classified as homogeneous, for example, at depths of X390 and X420.

Figure 14:
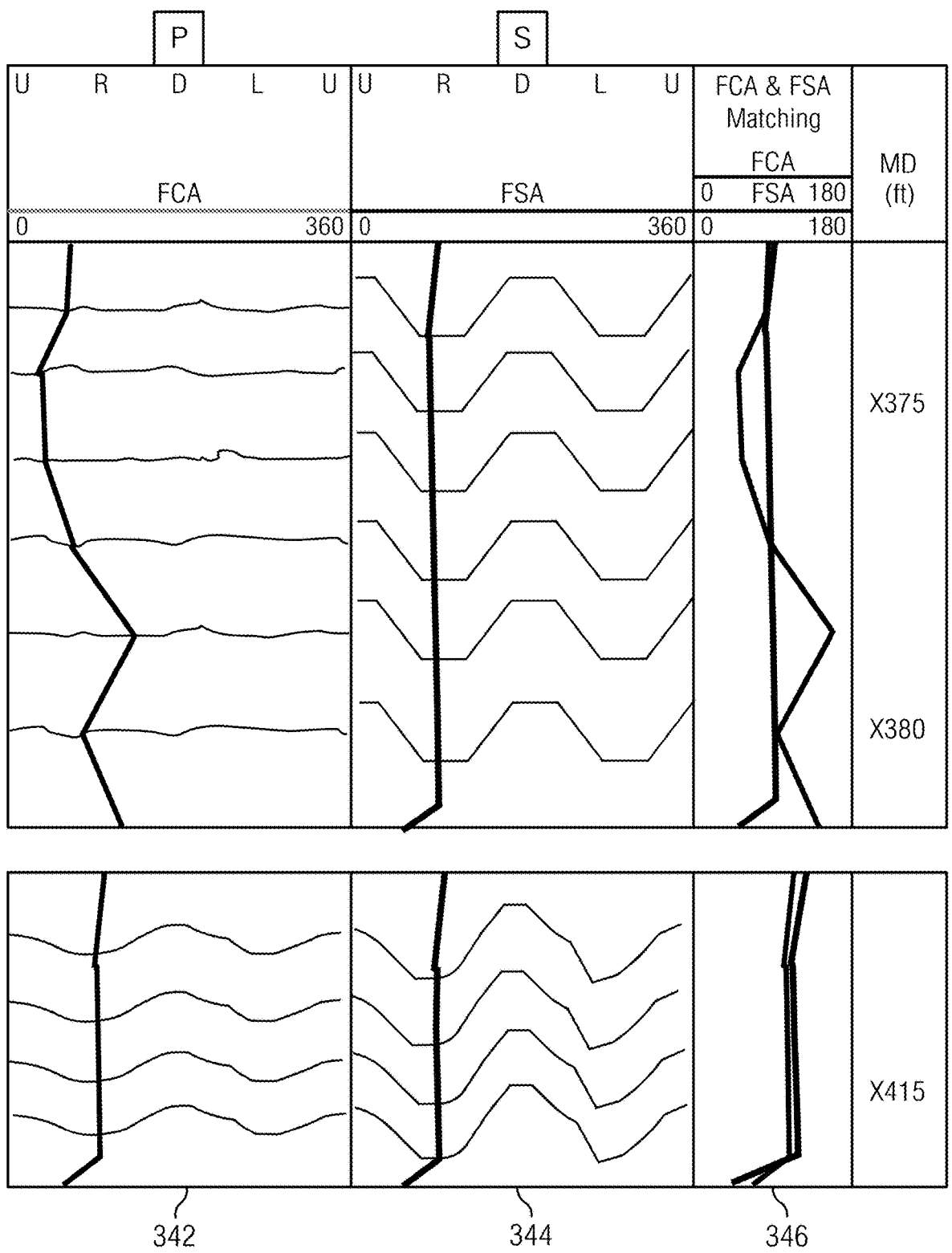
FIG. 14 depicts a portion of an example ultrasonic pitch-catch slowness log showing P-wave and S-wave slowness profiles and fast P-wave and S-wave azimuth directions.

FIG. 14 depicts ultrasonic pitch-catch data at several depths obtained in an example borehole logging operation. A P-wave slowness profile is depicted at 342 and an S-wave slowness profile is depicted at 344. The depicted S-wave slowness profiles are all periodic with azimuth having a period of about 180 degrees (e.g., from about 150 to 210 degrees). At these depths the amplitude of the periodic component (also referred to as the variation of the periodic component) exceeds a threshold (not depicted in the log) such that the formation may be classified as anisotropic. At a measured depth of X415 feet the P-wave slowness values are also periodic (having a period of about 180 degrees) and the amplitude of the periodic component exceeds a corresponding threshold (again not depicted on the log). The formation may therefore be classified as stress-induced anisotropic (since the amplitudes of both the S-wave and P-wave periodic components exceed corresponding thresholds). At a measured depth of X375 feet the P-wave slowness values are not strongly periodic (such that the amplitude of periodic component is less than the threshold). The formation may therefore be classified as intrinsic anisotropic.

FIG. 14 further depicts a plot of the fastest compressional azimuth (FCA delineated in black) and the fastest shear azimuth (FSA delineated in grey) with measured depth at 346. The FCA represents the azimuthal direction at which the compressional wave slowness is a minimum while the FSA represents the azimuthal direction at which the shear wave slowness is a minimum (minimum slowness representing fastest wave speed). In accordance with the disclosed embodiments, the FCA and FSA may also be evaluated to classify anisotropy. For example, when a difference between FCA and FSA is less than a threshold, the formation may be classified as stress-induced anisotropic. When the difference between FCA and FSA is greater than the threshold, the formation may be classified as intrinsic anisotropic or isotropic. In FIG. 14, FCA and FSA are nearly equal at measured depths near X415 indicating a stress-induced anisotropic formation. FCA and FSA differ significantly at measured depths near X375 and X380 indicating an intrinsic anisotropic formation.

Figure 15:
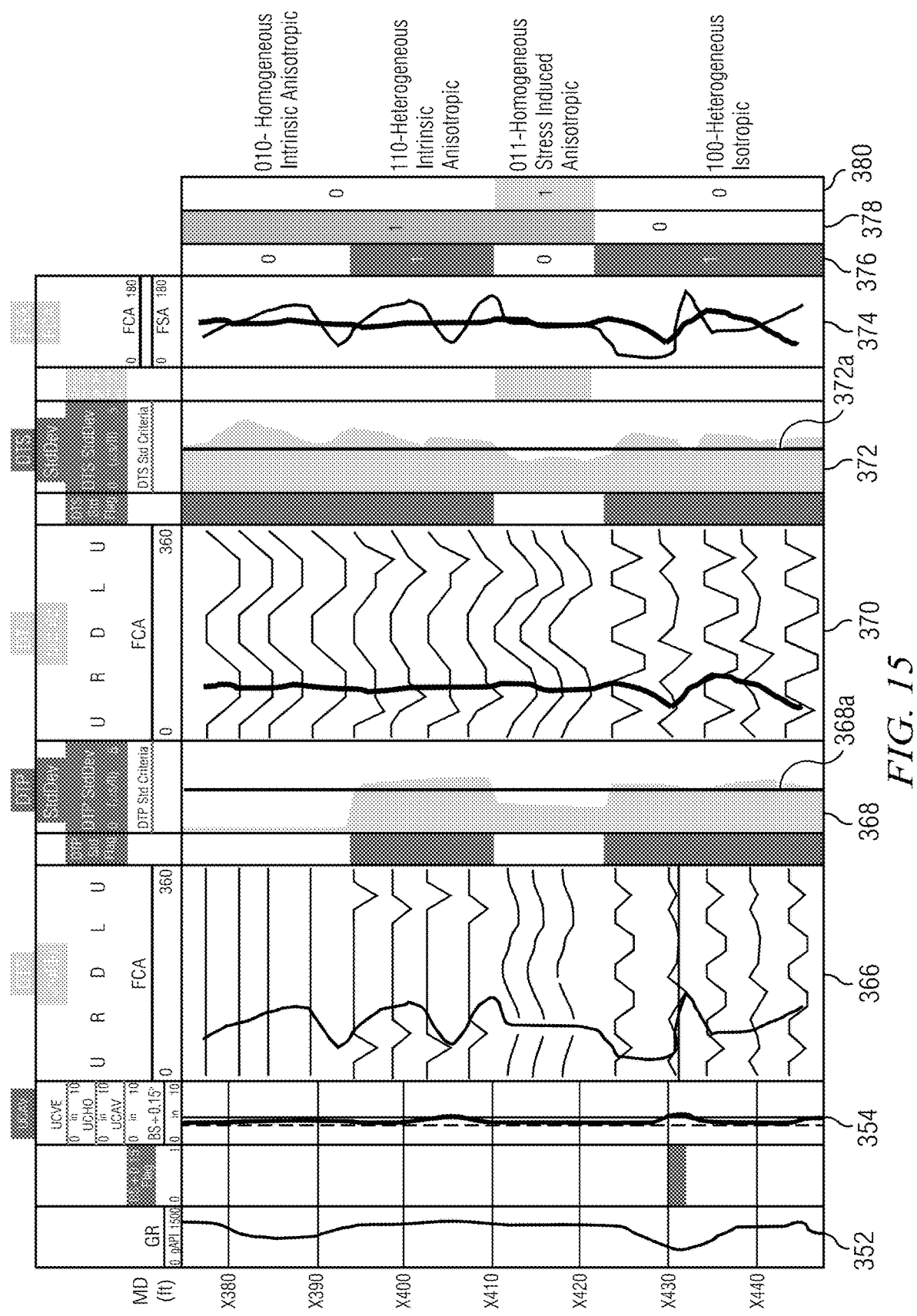
FIG. 15 depicts a portion of an example log including both ultrasonic pulse-echo and ultrasonic pitch-catch measurements. Classified formation intervals are also shown.

FIG. 15 depicts an example ultrasonic log including both ultrasonic pulse-echo and ultrasonic pitch-catch measurements. The log illustrates example methods for classifying a subterranean formation. Gamma ray data is depicted at 352. A borehole diameter log obtained from the ultrasonic pulse-echo measurements is shown at 354. Compressional wave slowness and shear wave slowness profiles are shown at 366, 370 with corresponding standard deviations shown at 368, 372 (with corresponding standard deviation thresholds at 368*a*, 372*a*). Fast compressional azimuth and fast shear azimuth are shown and compared at 374. The log data extends from a measured depth of about X375 to X445 feet.

In this example embodiment, the homogeneity/heterogeneity of the formation was evaluated in a first step (376), followed by an evaluation of the isotropy/anisotropy in a second step (378), and then followed by an evaluation of intrinsic/stress-induced anisotropy in a third step (380). Four different formation types (e.g., out of a possible 6 or 7 in Table 1) were observed in this example log (the disclosed embodiments are of course not limited in this regard). In a first measured depth region, ranging from about X375 to about X390 feet, the formation was classified as homogeneous intrinsic anisotropic (010). The standard deviation of the compressional wave slowness was low (below threshold) in column 368 and may therefore indicate a homogeneous formation at 376. In this depth region the S-wave slowness values had a period of about 180 degrees with the amplitude of the periodic component exceeding a threshold (see the shear slowness profile in column 370) such that the formation may be classified as anisotropic at 378. The amplitude of the periodic component of the P-wave slowness values was less than threshold (see column 366) such that the formation may be classified as intrinsic anisotropic at 380. Moreover, the difference between FCA and FSA was greater than a corresponding threshold at most depths in the region further indicating an intrinsic anisotropic formation (see column 374).

In a second measured depth region, ranging from about X390 to about X410 feet, the formation was classified as heterogeneous intrinsic anisotropic (110). The standard deviations of both the P-wave and S-wave slowness values were above the corresponding thresholds as indicated in columns 368 and 372. These criteria may indicate a heterogeneous formation at 376. The amplitude of a periodic component of the S-wave slowness exceeded the threshold (see column 370) such that the formation may be classified as anisotropic at 378. The amplitude of the periodic component of the P-wave slowness values was less than threshold (see column 366) such that the formation may be classified as intrinsic anisotropic at 380. As with the first region, the difference between FCA and FSA was greater than the corresponding threshold at most depths (column 374) further indicating an intrinsic anisotropic formation.

In a third measured depth region, ranging from about X410 to about X420 feet, the formation was classified as homogeneous stress-induced anisotropic (011). The standard deviation of both the P-wave and S-wave slowness values was below the corresponding threshold values (in columns 368 and 372). Each of these criteria may indicate a homogeneous formation at 376. The amplitudes of the corresponding periodic components of both the S-wave and P-wave slowness exceeded corresponding thresholds (in columns 370 and 366) such that the formation may be classified as stress-induced anisotropic at 380. Moreover, the difference between FCA and FSA was below threshold further indicating a stress-induced anisotropic formation (column 374).

In the fourth measured depth region, ranging from about X420 to about X445 feet, the formation was classified as heterogeneous isotropic (100). The standard deviation of both the P-wave and S-wave slowness values was above threshold (in columns 368 and 372). Each of these criteria may indicate a heterogeneous formation at 376. The amplitudes of periodic components of the S-wave and P-wave slowness were less than corresponding thresholds (in columns 370 and 366) such that the formation may be classified as isotropic. Consistent with this classification, the difference between FCA and FSA was above threshold (column 374).

Figure 16:
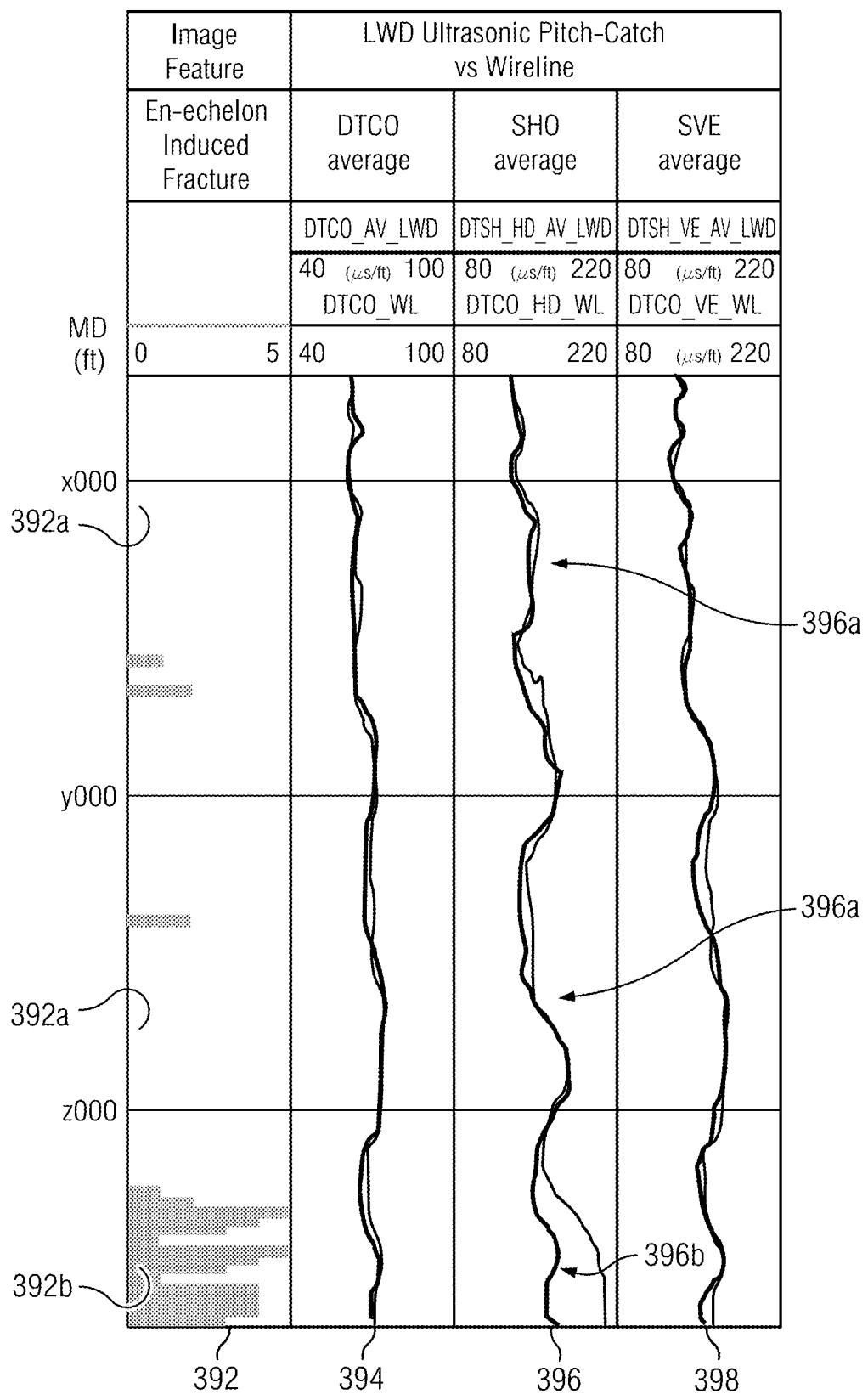
FIG. 16 depicts an example log comparing LWD ultrasonic slowness measurements and wireline (WL) sonic slowness measurements.

FIG. 16 depicts an example log comparing LWD ultrasonic slowness measurements and wireline (WL) sonic slowness measurements over an approximately 2500 foot measured depth interval. The log shows en-echelon induced fracture counts at 392, average compressional slowness at 394 with LWD ultrasonic slowness shown as a thick line and WL sonic slowness as a thin line, horizontal shear slowness at 396 with LWD ultrasonic slowness as a thick line and WL sonic slowness shown as a thin line, and vertical shear slowness at 398 with LWD ultrasonic slowness as a thick line and WL sonic slowness as a thin line. The formation was classified as intrinsic anisotropic at measured depths above Z000 (e.g., at X000 and Y000) and stress-induced anisotropic at measured depths below Z000.

With continued reference to FIG. 16, there is good agreement in this example log between the LWD ultrasonic slowness values and the WL sonic slowness values in the intrinsic anisotropic formation, for example, as shown at 396a. In the stress-induced formation the LWD ultrasonic horizontal shear slowness was considerably less than the WL sonic horizontal shear slowness as indicated at 396b. Note also the presence of induced fractures in the stress-induced formation at 392b (which indicates that the formation may be stress-induced anisotropic in this region) and the absence of fractures in the intrinsic anisotropic formation at 392a.

Figure 17:
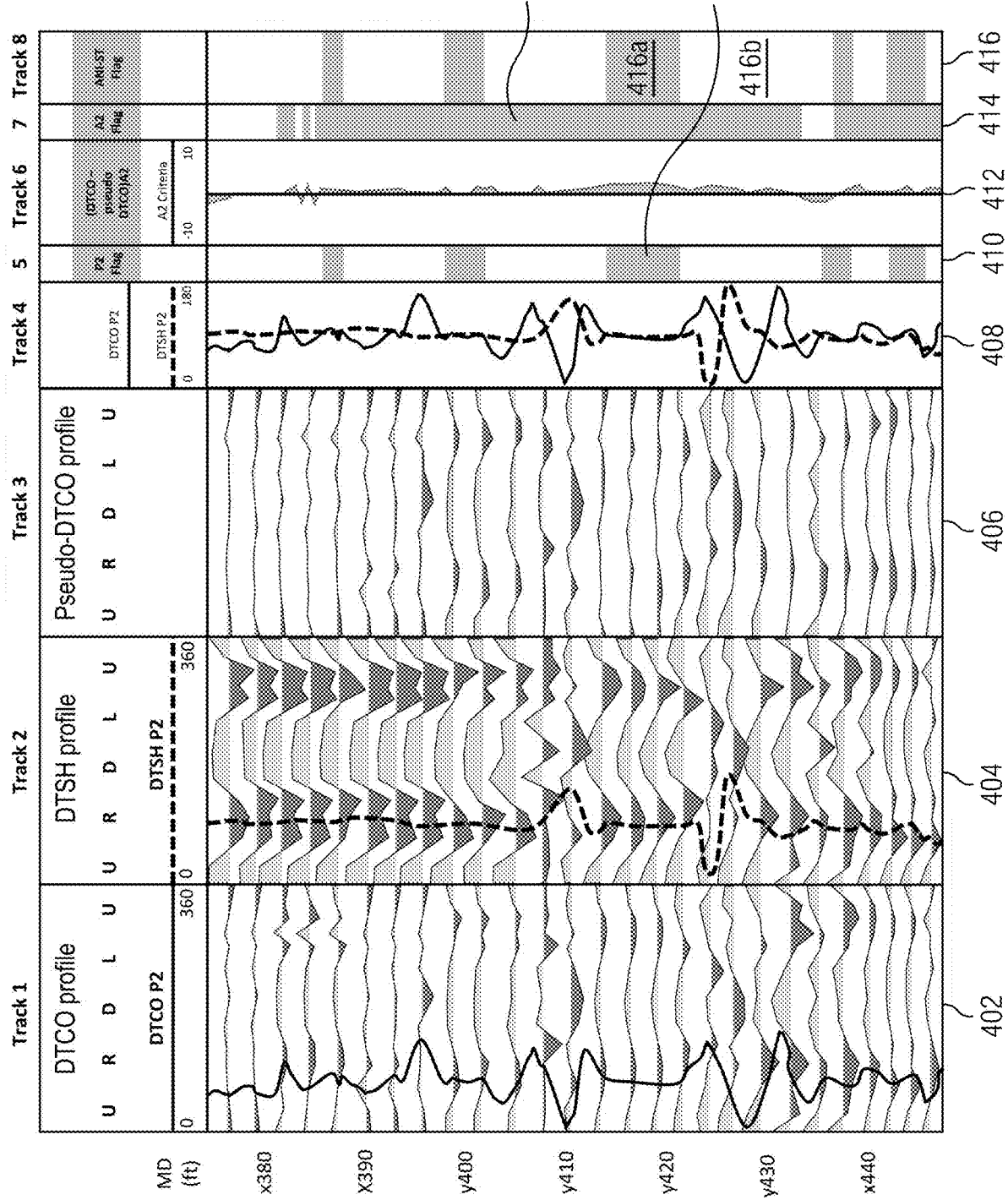
FIGS. 17-19 depict example ultrasonic logs illustrating the method shown on FIG. 8.
Figure 18:
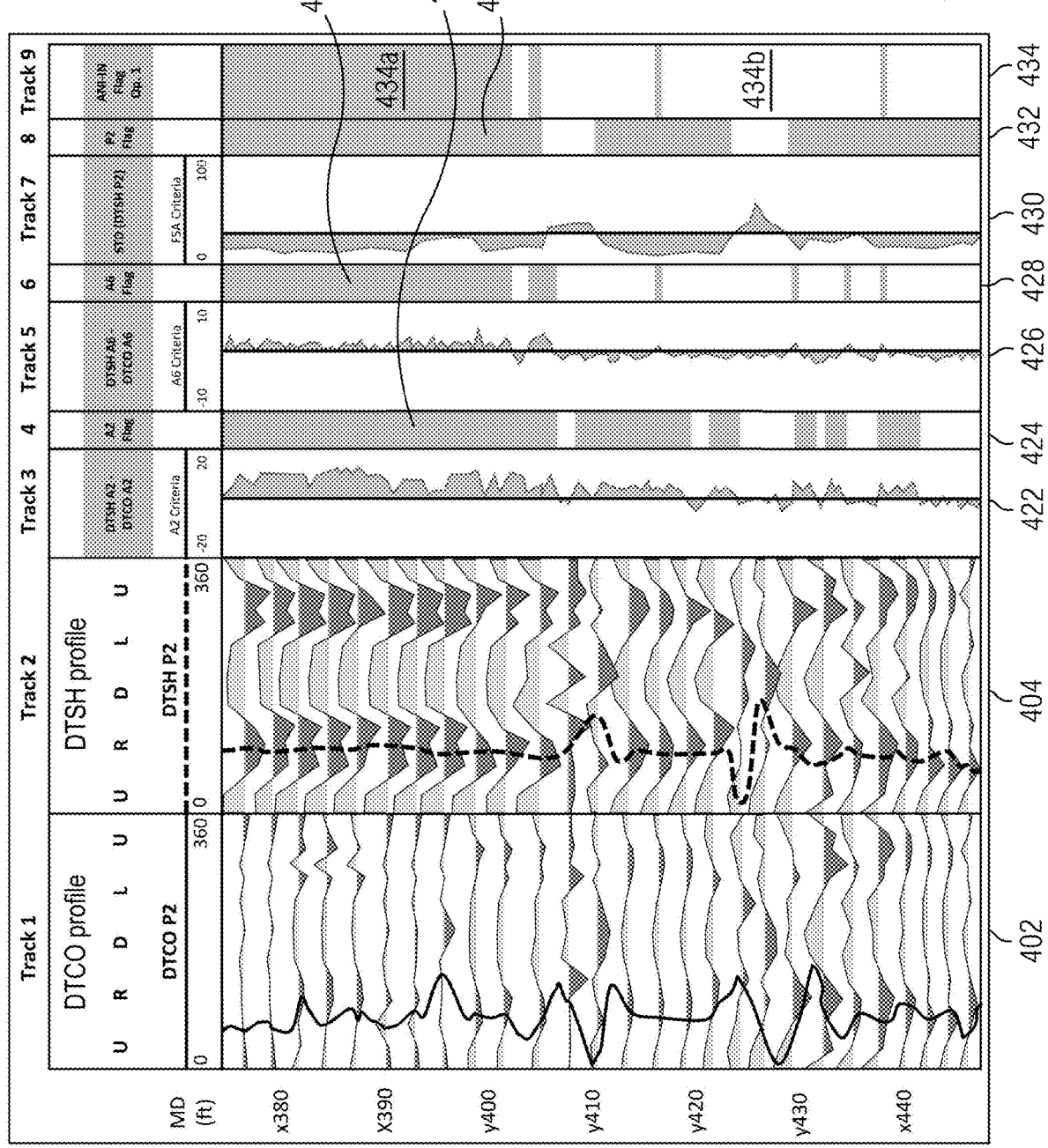
Figure 19:
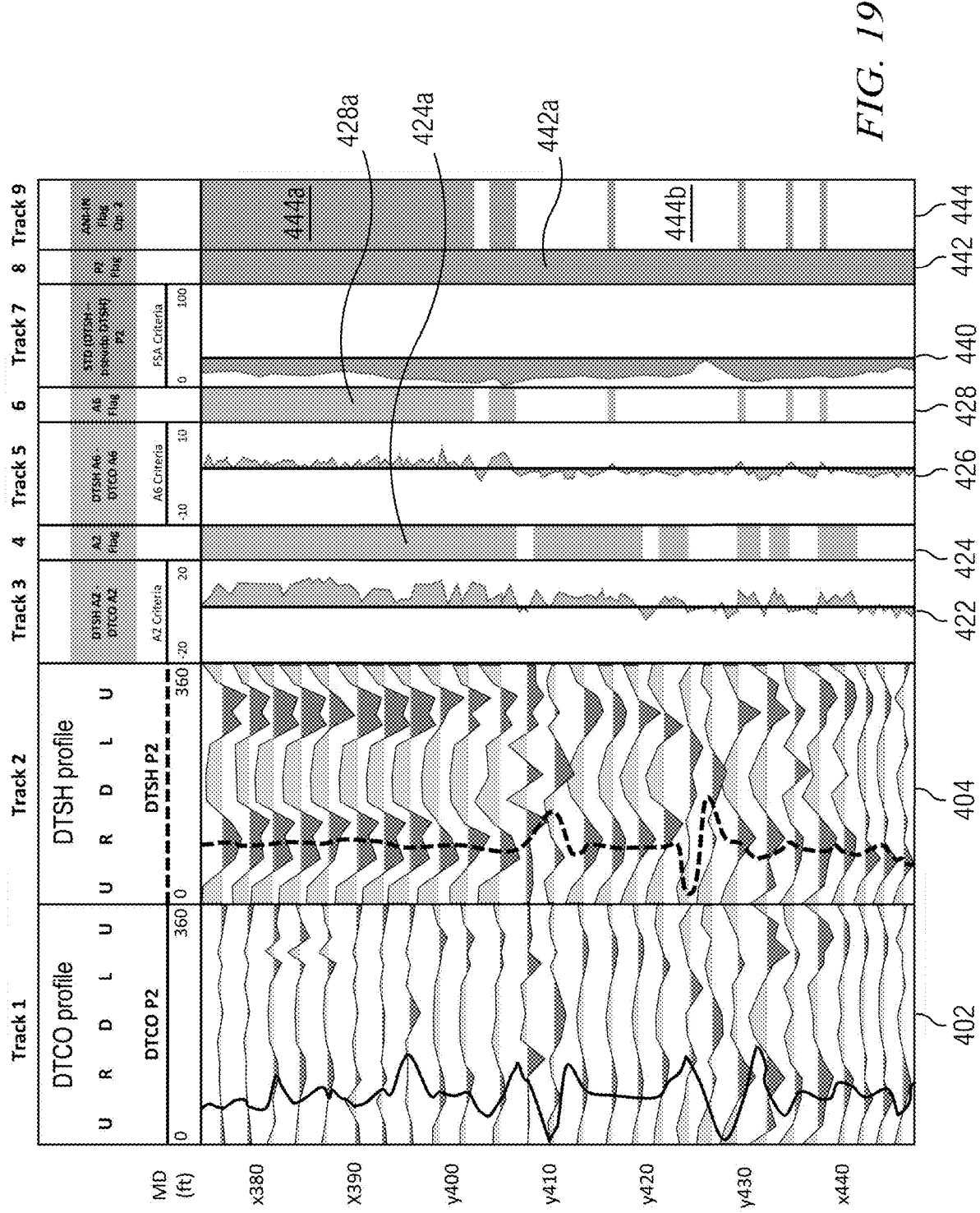

FIGS. 17, 18, and 19 depict example ultrasonic logs including compressional (DTCO) and shear (DTSH) wave images obtained from ultrasonic pitch-catch measurements at 402 and 404. The example ultrasonic logs are evaluated to classify a subterranean as being isotropic, stress-induced anisotropic, intrinsic anisotropic, or both stress-induced and intrinsic anisotropic as described above with respect to method 200 in FIG. 8. FIG. 17 illustrates classification of the formation as stress-induced anisotropic or not stress-induced anisotropic. FIGS. 18 and 19 illustrate first and second options for classifying the formation as intrinsic anisotropic or not intrinsic anisotropic.

In FIG. 17, a pseudo compressional wave image (pseudo DTCO) is shown in track 3 at 406 and may be computed for example as described at 214 of method 200 and FIG. 9. The compressional and shear second harmonic phase (P2) are shown in track 4 at 408 with an agreement flag shown in track 5 at 410 (e.g., when the difference between the compressional and shear second harmonic phase is less than a threshold at 410a). A periodic component amplitude of a difference between the compressional slowness and pseudo compressional slowness is shown in track 6 at 412 with an agreement flag shown in track 7 at 414 (e.g., when the difference is greater than a threshold at 414a). Portions of the formation are flagged as being stress-induced anisotropic 416a in track 8 at 416. The remainder of the formation is classified as not stress-induced anisotropic at 416b.

In FIG. 18, a difference between a first shear wave periodic component (DTSH A2) and a first compressional wave periodic component (DTCO A2) is shown in track 3 at 422 with an agreement flag shown in track 4 at 424 (e.g., when the difference is greater than a threshold at 424a). A difference between a second shear wave periodic component (DTSH A6) and a second compressional wave periodic component (DTCO A6) is shown in track 5 at 426 with an agreement flag shown in track 6 at 428 (e.g., when the difference is greater than a threshold at 428a). The standard deviation of the shear wave phase (P2) is shown in track 7 at 430 with a corresponding flag shown in track 8 at 432 (e.g., when the standard deviation exceeds a threshold at 432a). Portions of the formation are flagged as being intrinsic anisotropic 434a in track 9 at 434. The remainder of the formation is classified as not intrinsic anisotropic at 434b.

In FIG. 19, tracks 1-6 are identical to those shown in FIG. 18. A standard deviation of a difference between the shear wave (DTSH) and pseudo shear wave (pseudo DTSH) phase (P2) is show in track 7 at 440. The pseudo DTSH may be computed, for example, as described at 222 of method 200 and FIG. 10. A corresponding flag is shown in track 8 at 442 (e.g., when the standard deviation of the difference is less than a threshold at 442a). Portions of the formation are flagged as being intrinsic anisotropic 444a in track 9 at 444. The remainder of the formation is classified as not intrinsic anisotropic at 444b.

It will be understood that in certain embodiments the formation classification(s) described above may advantageously provide feedback to a rig site operator. For example, an indication of stress-induced anisotropy or borehole damage may indicate operational issues during drilling that may be corrected or may indicate borehole sections that require particular attention during completion or subsequent sampling or coring operations.

It will be understood that the various steps in the disclosed formation classification methodology may be implemented on a downhole processor (controller). By downhole processor it is meant an electronic processor (e.g., a microprocessor or digital controller) deployed in the drill string (e.g., in the ultrasonic logging tool or elsewhere in the BHA). For example, the disclosed methods may be fully or partially implemented downhole.

It will be understood that the present disclosure includes numerous embodiments. These embodiments include, but are not limited to, the following embodiments.

In a first embodiment, a method for classifying a subterranean formation comprises rotating an ultrasonic logging tool in a borehole penetrating a formation, the ultrasonic logging tool including an ultrasonic transducer and an array of spaced apart ultrasonic receivers deployed on a logging tool body; measuring an azimuthal shear slowness image and an azimuthal compressional slowness image while the ultrasonic logging tool rotates in the borehole; and evaluating the azimuthal shear slowness image and the azimuthal compressional slowness image to classify the formation as (i) homogeneous or heterogeneous, (ii) stress-induced anisotropic or not stress-induced anisotropic, and (iii) intrinsic anisotropic or not intrinsic anisotropic.

A second embodiment may include the first embodiment, further comprising measuring an ultrasonic pulse-echo amplitude image while the ultrasonic logging tool rotates in the borehole, wherein the evaluating the azimuthal shear slowness image and the azimuthal compressional slowness image to classify the formation comprises evaluating the azimuthal shear slowness image, the azimuthal compressional slowness image, and the pulse-echo amplitude image to classify the formation.

A third embodiment may include any one of the first or second embodiments, further comprising: determining a periodic component of the azimuthal shear slowness and a non-periodic component of the azimuthal shear slowness image using a two-cycle Fourier series expansion of the azimuthal shear slowness image; and determining a periodic component of the azimuthal compressional slowness and a non-periodic component of the azimuthal compressional slowness image using a two-cycle Fourier series expansion of the azimuthal compressional slowness image.

A fourth embodiment may include the third embodiment, wherein the formation is classified as homogeneous when the non-periodic component of the azimuthal compressional slowness image is less than a threshold and classified as heterogeneous when the non-periodic component of the azimuthal compressional slowness image is greater than the threshold.

A fifth embodiment may include any one of the third or fourth embodiments, wherein the formation is classified as stress-induced anisotropic when a first difference between a phase of the periodic component of the azimuthal compressional image and a phase of the periodic component of the azimuthal shear image is less than a first threshold.

A sixth embodiment may include the fifth embodiment, wherein the formation is classified as stress-induced anisotropic when the difference between the phase of the periodic component of the azimuthal compressional image and the phase of the periodic component of the azimuthal shear image is less than the first threshold and an amplitude of a difference between the periodic component of the azimuthal compressional image and a pseudo compressional image is greater than a second threshold, wherein the pseudo compressional image is computed from an amplitude of the pulse echo image.

A seventh embodiment may include any one of the third through sixth embodiments, wherein the formation is classified as intrinsic anisotropic when a first difference between a first amplitude of the periodic component of the azimuthal shear image and the first amplitude of the periodic component of the azimuthal compressional image is greater than a first threshold and a second difference between a second amplitude of the periodic component of the azimuthal shear image and the second amplitude of the periodic component of the azimuthal compressional image is greater than a second threshold.

An eighth embodiment may include the seventh embodiment, wherein the formation is classified as intrinsic anisotropic when a first difference between a first amplitude of the periodic component of the azimuthal shear image and the first amplitude of the periodic component of the azimuthal compressional image is greater than a first threshold, a second difference between a second amplitude of the periodic component of the azimuthal shear image and the second amplitude of the periodic component of the azimuthal compressional image is greater than a second threshold, and a standard deviation of a phase of the periodic component of the azimuthal shear image is less than a third threshold.

A ninth embodiment may include the seventh embodiment, wherein the formation is classified as intrinsic anisotropic when a first difference between an amplitude of a second order harmonic of the azimuthal shear image and an amplitude of a second order harmonic of the azimuthal compressional image is greater than a first threshold, a second difference between an amplitude of a sixth order harmonic of the azimuthal shear image and an amplitude of sixth order harmonic of the azimuthal compressional image is greater than a second threshold, and a standard deviation of a phase of a third difference between the periodic component of the azimuthal shear image and pseudo shear image is less than a third threshold, wherein the pseudo shear image is computed from the azimuthal compressional image.

A tenth embodiment may include any one of the first through ninth embodiments, wherein the formation is further classified as isotropic when the formation is classified as not stress-induced anisotropic and not intrinsic anisotropic.

In an eleventh embodiment an ultrasonic logging tool comprises a logging tool body; an ultrasonic transducer deployed in the logging tool body; an array of spaced apart ultrasonic receivers deployed in the logging tool body; a controller deployed in the logging tool body and configured to: measure an ultrasonic pulse-echo amplitude image, and azimuthal shear slowness image, and an azimuthal compressional slowness image while the ultrasonic logging tool rotates in a borehole penetrating a formation; evaluate the ultrasonic pulse-echo amplitude image, the azimuthal shear slowness image, and the azimuthal compressional slowness image to classify the formation as (i) homogeneous or heterogeneous, (ii) stress-induced anisotropic or not stress-induced anisotropic, and (iii) intrinsic anisotropic or not intrinsic anisotropic.

A twelfth embodiment may include the eleventh embodiment, wherein the controller is further configured to: cause the ultrasonic transducer to transmit an ultrasonic waveform into the formation while the ultrasonic logging tool rotates in the borehole; cause the transducer to receive the transmitted ultrasonic waveform; cause the array of spaced apart ultrasonic receivers to receive the transmitted ultrasonic waveform at each of the ultrasonic receivers in the array; and evaluate the received ultrasonic waveforms to compute the ultrasonic pulse-echo amplitude image, the azimuthal shear slowness image, and the azimuthal compressional slowness image.

A thirteenth embodiment may include any one of the eleventh or twelfth embodiments, wherein the controller is configured to classify the formation as homogeneous when a non-periodic component of the azimuthal compressional slowness image is less than a threshold and to classify the formation as heterogeneous when a non-periodic component of the azimuthal compressional slowness image is greater than the threshold.

A fourteenth embodiment may include any one of the eleventh through thirteenth embodiments, wherein the controller is configured to classify the formation as stress-induced anisotropic when a difference between a phase of a periodic component of the azimuthal compressional image and a phase of a periodic component of the azimuthal shear image is less than a threshold.

A fifteenth embodiment may include any one of the eleventh through fourteenth embodiments, wherein the controller is configured to classify the formation as intrinsic anisotropic when a first difference between a first amplitude of a periodic component of the azimuthal shear image and the first amplitude of a periodic component of the azimuthal compressional image is greater than a first threshold, a second difference between a second amplitude of the periodic component of the azimuthal shear image and the second amplitude of the periodic component of the azimuthal compressional image is greater than a second threshold, and a standard deviation of a phase of the periodic component of the azimuthal shear image is less than a third threshold.

A sixteenth embodiment may include any one of the eleventh through fifteenth embodiments, wherein the controller is configured to classify the formation as intrinsic anisotropic when a first difference between an amplitude of a second order harmonic of the azimuthal shear image and an amplitude of a second order harmonic of the azimuthal compressional image is greater than a first threshold, a second difference between an amplitude of sixth order harmonic of the azimuthal shear image and an amplitude of a sixth order harmonic of the azimuthal compressional image is greater than a second threshold, and a standard deviation of a phase of a third difference between the periodic component of the azimuthal shear image and a pseudo shear image is less than a third threshold, wherein the pseudo shear image is computed from the azimuthal compressional image.

In a seventeenth embodiment, a method for classifying a subterranean formation comprises rotating an ultrasonic logging tool in a borehole, the ultrasonic logging tool including an ultrasonic transducer and an array of spaced apart ultrasonic receivers deployed on a logging tool body; measuring an azimuthal shear slowness image and an azimuthal compressional slowness image while the ultrasonic logging tool rotates in the borehole; evaluating a periodic component of the azimuthal shear slowness image to classify the formation as isotropic or anisotropic; and evaluating a periodic component of the azimuthal compressional slowness image to classify the formation as intrinsic anisotropic or stress-induced anisotropic.

An eighteenth embodiment may include the seventeenth embodiment, further comprising classifying the formation as homogeneous when a non-periodic component of the azimuthal compressional slowness image is less than a threshold and classifying the formation as heterogeneous when the non-periodic component of the azimuthal compressional slowness image is greater than the threshold.

A nineteenth embodiment may include the seventeenth or eighteenth embodiment, wherein the evaluating the periodic component of the azimuthal shear slowness image comprises classifying the formation as isotropic when an amplitude of the periodic component of the azimuthal shear slowness is less than a threshold and classifying the formation as anisotropic when the amplitude of the periodic component of the azimuthal shear slowness is greater than the threshold.

A twentieth embodiment may include any one of the seventeenth through nineteenth embodiments, wherein the evaluating the periodic component of the compressional wave slowness comprises classifying the formation as intrinsic anisotropic when an amplitude of the periodic component of the azimuthal compressional slowness is less than a threshold and classifying the formation as stress-induced anisotropic when the amplitude of the periodic component of the azimuthal compressional slowness is greater than the threshold.

Although an ultrasonic borehole classification method has been described in detail, it should be understood that various changes, substitutions, and alternations can be made herein without departing from the spirit and scope of the disclosure as defined by the appended claims.

What is claimed is:

1. A method for classifying a subterranean formation, the method comprising:
    rotating an ultrasonic logging tool in a borehole penetrating a formation, the ultrasonic logging tool including an ultrasonic transducer and an array of spaced apart ultrasonic receivers deployed on a logging tool body;
    measuring an ultrasonic pulse-echo amplitude image, an azimuthal shear slowness image, and an azimuthal compressional slowness image while rotating the ultrasonic logging tool in the borehole; and
    evaluating the pulse-echo amplitude image, the azimuthal shear slowness image, and the azimuthal compressional slowness image to classify the formation as (i) homogeneous or heterogeneous, (ii) stress-induced anisotropic or not stress-induced anisotropic, and (iii) intrinsic anisotropic or not intrinsic anisotropic.

2. The method of claim 1, further comprising:
    determining a periodic component of the azimuthal shear slowness image and a non-periodic component of the azimuthal shear slowness image using a two-cycle Fourier series expansion of the azimuthal shear slowness image; and
    determining a periodic component of the azimuthal compressional slowness image and a non-periodic component of the azimuthal compressional slowness image using a two-cycle Fourier series expansion of the azimuthal compressional slowness image.

3. The method of claim 2, wherein the formation is classified as homogeneous when the non-periodic component of the azimuthal compressional slowness image is less than a threshold and classified as heterogeneous when the non-periodic component of the azimuthal compressional slowness image is greater than the threshold.

4. The method of claim 2, wherein the formation is classified as stress-induced anisotropic when a first difference between a phase of the periodic component of the azimuthal compressional slowness image and a phase of the periodic component of the azimuthal shear slowness image is less than a first threshold.

5. The method of claim 4, wherein the formation is classified as stress-induced anisotropic when the difference between the phase of the periodic component of the azimuthal compressional slowness image and the phase of the periodic component of the azimuthal shear slowness image is less than the first threshold and an amplitude of a difference between the periodic component of the azimuthal compressional slowness image and a pseudo compressional slowness image is greater than a second threshold, wherein the pseudo compressional slowness image is computed from an amplitude of the pulse echo image.

6. The method of claim 2, wherein the formation is classified as intrinsic anisotropic when a first difference between a first amplitude of the periodic component of the azimuthal shear slowness image and the first amplitude of the periodic component of the azimuthal compressional slowness image is greater than a first threshold and a second difference between a second amplitude of the periodic component of the azimuthal shear slowness image and the second amplitude of the periodic component of the azimuthal compressional slowness image is greater than a second threshold.

7. The method of claim 6, wherein the formation is classified as intrinsic anisotropic when a first difference between a first amplitude of the periodic component of the azimuthal shear slowness image and the first amplitude of the periodic component of the azimuthal compressional slowness image is greater than a first threshold, a second difference between a second amplitude of the periodic component of the azimuthal shear slowness image and the second amplitude of the periodic component of the azimuthal compressional slowness image is greater than a second threshold, and a standard deviation of a phase of the periodic component of the azimuthal shear slowness image is less than a third threshold.

8. The method of claim 6, wherein the formation is classified as intrinsic anisotropic when a first difference between an amplitude of a second order harmonic of the azimuthal shear slowness image and an amplitude of a second order harmonic of the azimuthal compressional slowness image is greater than a first threshold, a second difference between an amplitude of a sixth order harmonic of the azimuthal shear slowness image and an amplitude of sixth order harmonic of the azimuthal compressional slowness image is greater than a second threshold, and a standard deviation of a phase of a third difference between the periodic component of the azimuthal shear slowness image and pseudo shear slowness image is less than a third threshold, wherein the pseudo shear slowness image is computed from the azimuthal compressional slowness image.

9. The method of claim 1, wherein the formation is further classified as isotropic when the formation is classified as not stress-induced anisotropic and not intrinsic anisotropic.

10. An ultrasonic logging tool comprising:
a logging tool body;
an ultrasonic transducer deployed in the logging tool body;
an array of spaced apart ultrasonic receivers deployed in the logging tool body; and
a controller deployed in the logging tool body and configured to:
measure an ultrasonic pulse-echo amplitude image, an azimuthal shear slowness image, and an azimuthal compressional slowness image while the ultrasonic logging tool rotates in a borehole penetrating a formation; and
evaluate the ultrasonic pulse-echo amplitude image, the azimuthal shear slowness image, and the azimuthal compressional slowness image to classify the formation as (i) homogeneous or heterogeneous, (ii) stress-induced anisotropic or not stress-induced anisotropic, and (iii) intrinsic anisotropic or not intrinsic anisotropic.

11. The ultrasonic logging tool of claim 10, wherein the controller is further configured to:
cause the ultrasonic transducer to transmit an ultrasonic waveform into the formation while the ultrasonic logging tool rotates in the borehole;
cause the ultrasonic transducer to receive the transmitted ultrasonic waveform;
cause the array of spaced apart ultrasonic receivers to receive the transmitted ultrasonic waveform at each of the ultrasonic receivers in the array; and
evaluate the received ultrasonic waveforms to compute the ultrasonic pulse-echo amplitude image, the azimuthal shear slowness image, and the azimuthal compressional slowness image.

12. The ultrasonic logging tool of claim 10, wherein the controller is configured to classify the formation as homogeneous when a non-periodic component of the azimuthal compressional slowness image is less than a threshold and to classify the formation as heterogeneous when a non-periodic component of the azimuthal compressional slowness image is greater than the threshold.

13. The ultrasonic logging tool of claim 10, wherein the controller is configured to classify the formation as stress-induced anisotropic when a difference between a phase of a periodic component of the azimuthal compressional slowness image and a phase of a periodic component of the azimuthal shear slowness image is less than a threshold.

14. The ultrasonic logging tool of claim 10, wherein the controller is configured to classify the formation as intrinsic anisotropic when a first difference between a first amplitude of a periodic component of the azimuthal shear slowness image and the first amplitude of a periodic component of the azimuthal compressional slowness image is greater than a first threshold, a second difference between a second amplitude of the periodic component of the azimuthal shear slowness image and the second amplitude of the periodic component of the azimuthal compressional slowness image is greater than a second threshold, and a standard deviation of a phase of the periodic component of the azimuthal shear slowness image is less than a third threshold.

15. The ultrasonic logging tool of claim 10, wherein the controller is configured to classify the formation as intrinsic anisotropic when a first difference between an amplitude of a second order harmonic of the azimuthal shear slowness image and an amplitude of a second order harmonic of the azimuthal compressional slowness slowness image is greater than a first threshold, a second difference between an amplitude of sixth order harmonic of the azimuthal shear slowness image and an amplitude of a sixth order harmonic of the azimuthal compressional slowness image is greater than a second threshold, and a standard deviation of a phase of a third difference between the periodic component of the azimuthal shear slowness image and a pseudo shear image is less than a third threshold, wherein the pseudo shear image is computed from the azimuthal compressional slowness image.

16. A method for classifying a subterranean formation, the method comprising:
- rotating an ultrasonic logging tool in a borehole, the ultrasonic logging tool including an ultrasonic transducer and an array of spaced apart ultrasonic receivers deployed on a logging tool body;
- measuring an azimuthal shear slowness image and an azimuthal compressional slowness image while the ultrasonic logging tool rotates in the borehole;
- evaluating a periodic component of the azimuthal shear slowness image to classify the formation as isotropic or anisotropic; and
- evaluating a periodic component of the azimuthal compressional slowness image to classify the formation as intrinsic anisotropic or stress-induced anisotropic.

17. The method of claim 16, further comprising classifying the formation as homogeneous when a non-periodic component of the azimuthal compressional slowness image is less than a threshold and classifying the formation as heterogeneous when the non-periodic component of the azimuthal compressional slowness image is greater than the threshold.

18. The method of claim 16, wherein the evaluating the periodic component of the azimuthal shear slowness image comprises classifying the formation as isotropic when an amplitude of the periodic component of the azimuthal shear slowness image is less than a threshold and classifying the formation as anisotropic when the amplitude of the periodic component of the azimuthal shear slowness image is greater than the threshold.

19. The method of claim 16, wherein the evaluating the periodic component of the azimuthal compressional slowness image comprises classifying the formation as intrinsic anisotropic when an amplitude of the periodic component of the azimuthal compressional slowness image is less than a threshold and classifying the formation as stress-induced anisotropic when the amplitude of the periodic component of the azimuthal compressional slowness image is greater than the threshold.

* * * * *